(12) United States Patent
Koehler et al.

(10) Patent No.: US 11,599,410 B2
(45) Date of Patent: Mar. 7, 2023

(54) APPARATUS AND METHOD FOR DETECTING AND CORRECTING PROBLEMS, FAILURES, AND ANOMALIES IN MANAGED COMPUTER SYSTEMS SUCH AS KIOSKS AND INFORMATIONAL DISPLAYS

(71) Applicant: Lakeside Software, LLC, Bloomfield Hills, MI (US)

(72) Inventors: Robert William Koehler, Southfield, MI (US); Nicholas Schumacher, Orchard Lake, MI (US); Francis Buggia, Ferndale, MI (US)

(73) Assignee: Lakeside Software, LLC, Bloomfield Hills, MI (US)

( * ) Notice: Subject to any disclaimer, the term of this patent is extended or adjusted under 35 U.S.C. 154(b) by 0 days.

(21) Appl. No.: 17/395,416

(22) Filed: Aug. 5, 2021

(65) Prior Publication Data

US 2022/0114045 A1  Apr. 14, 2022

Related U.S. Application Data

(60) Provisional application No. 63/090,947, filed on Oct. 13, 2020.

(51) Int. Cl.
*G06F 11/07* (2006.01)

(52) U.S. Cl.
CPC ...... *G06F 11/0793* (2013.01); *G06F 11/0709* (2013.01); *G06F 11/079* (2013.01)

(58) Field of Classification Search
CPC . G06F 11/0709; G06F 11/079; G06F 11/0793
See application file for complete search history.

(56) References Cited

U.S. PATENT DOCUMENTS

| 8,650,443 B2 * | 2/2014 | Sakurai ................. G06F 9/4406 714/36 |
| 9,563,496 B2 * | 2/2017 | Otsuka ................ G06F 11/0778 |
| 2019/0243739 A1 * | 8/2019 | Song .................... G06N 3/0454 |
| 2020/0257606 A1 * | 8/2020 | Schumacher ....... G06F 11/3476 |

* cited by examiner

*Primary Examiner* — Joseph R Kudirka
(74) *Attorney, Agent, or Firm* — Dykema Gossett PLLC

(57) ABSTRACT

In a kiosk or informational display, an apparatus for detecting and remediating problems, failures, and anomalies includes a data collection agent configured to collect original data over time associated with components, operation, and configuration of the managed computer system, a monitoring and learning module configured to process the original data and generate a historic record that includes time-based data, such as one or more time-based lists, an alert detection system that includes a sensor having associated therewith one of the time-based lists. The sensor is activated when sensor condition(s) are met, which includes evaluating the sensor condition(s) using at least the time-based list and a current-time value of the components, operation, and configuration of the managed computer system. The apparatus includes a remediation action module configured to effect at least one of a plurality of predetermined actions when the sensor is activated.

21 Claims, 16 Drawing Sheets

| Alarm No. | Trigger (Condition) | State | Applicability Criteria |
|---|---|---|---|
| 1 | Event -1 | Active | AC-1 |
| 2 | M.V.>TH | Inactive | AC-1 |
| . | . | . | . |
| . | . | . | . |
| . | . | . | . |
| N | Event-2 | Active | AC-2 |

| Sensor No. | Trigger (Condition) | State | Applicability Criteria |
|---|---|---|---|
| 1 | Event -1 | Inactive | AC-1 |
| | Event - 2 | | |
| | M.V.>TH | | |
| 2 | M.V.>TH | Active | AC-1 |
| . | . | . | . |
| . | . | . | . |
| . | . | . | . |
| N | Event - 3 | Active | AC-1 |
| | Event - 4 | | |

| User Input Activity Table (186) |||
|---|---|---|
| Day of Week (188) | Time of Day (190) | User Input Activity (192) |
| Sunday (194₁) | breakfast | heavy (196₁) |
|  | lunch | medium (196₂) |
|  | dinner | heavy (196₃) |
| Monday (194₂) | lunch | medium (196₄) |
|  | dinner | light (196₅) |
| Tuesday (194₃) | lunch | medium |
|  | dinner | light |
| ⋮ | ⋮ | ⋮ |
| Saturday (194₇) | breakfast | heavy |
|  | lunch | medium |
|  | dinner | heavy |

FIG. 19

| Network Activity Table | | |
|---|---|---|
| Day of Week | Time of Day | Network Activity |
| Sunday | $TOD_1$ | $NA_1$ |
|  | $TOD_2$ | $NA_2$ |
|  | $TOD_3$ | $NA_3$ |
| Monday | $TOD_4$ | $NA_4$ |
|  | $TOD_5$ | $NA_5$ |
| Tuesday | $TOD_6$ | $NA_6$ |
|  | $TOD_7$ | $NA_7$ |
| ⋮ | ⋮ | ⋮ |
| Saturday | $TOD_8$ | $NA_8$ |
|  | $TOD_9$ | $NA_9$ |
|  | $TOD_{10}$ | $NA_{10}$ |

FIG. 21

APPARATUS AND METHOD FOR DETECTING AND CORRECTING PROBLEMS, FAILURES, AND ANOMALIES IN MANAGED COMPUTER SYSTEMS SUCH AS KIOSKS AND INFORMATIONAL DISPLAYS

CROSS-REFERENCE TO RELATED APPLICATIONS

This application claims the benefit of U.S. provisional application No. 63/090,947, filed 13 Oct. 2020 (the '947 application), which is hereby incorporated by reference as though fully set forth herein.

BACKGROUND a. Technical Field

This disclosure relates to an apparatus and method for detecting and correcting problems, failures, and/or anomalies in managed computer systems, such as kiosks, informational displays, and the like.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

It is known to provide a workspace analytics system having data collection/analysis functionality by using a commercial product available under the trade designation SYSTRACK from Lakeside Software, LLC, Bloomfield Hills, Mich. USA. In an embodiment, the SYSTRACK analytics platform provides enterprise IT with the business intelligence to address a broad set of operational and security requirements, empowering them to make better decisions, dramatically improve productivity and reduce costs. Further details of an exemplary workspace analytics system may be seen by reference to U.S. application Ser. No. 11/268,012 (the '012 application), now U.S. Pat. No. 7,865,499, entitled "SYSTEM AND METHOD FOR MANAGING INFORMATION FOR A PLURALITY OF COMPUTER SYSTEMS IN A DISTRIBUTED NETWORK" and U.S. application Ser. No. 15/629,189 (the '189 application), published as US PG PUB 2018/0060422, entitled "METHOD AND APPARATUS FOR NATURAL LANGUAGE QUERY IN A WORKSPACE ANALYTICS SYSTEM". Additionally, U.S. application Ser. No. 16/669,630, filed Oct. 31, 2019 (the '630 application), entitled "APPARATUS AND METHOD FOR DETERMINING THE UNDERLYING CAUSE OF USER EXPERIENCE DEGRADATION", was published under U.S. patent publication no. 2020/0257606 on Aug. 13, 2020. The '012 application, the '189 application, and the '630 application are all hereby incorporated by reference as though fully set forth herein.

Lakeside Software's SYSTRACK product provides digital experience monitoring for Windows, Mac, Linux, Android, ChromeOS, and iOS devices, for example only. The software is also applicable to a wide range of devices that are software-driven but lack the typical user interface that a desktop device has. Examples of such devices include computer-driven informational displays, kiosks used to provide information or accept simple customer orders, computer-assisted billboards and signs, and advertising displays found in elevators, hotels, and airports.

The computing systems that underlie these devices are very complex systems. They include hardware and firmware components, operating system software, drivers and kernel components, software packages and applications, and a myriad of configuration settings and data. They are made even more complex because these components are contributed from numerous sources and updated on an individual basis (in the case of software-related components) or as determined by the owner with respect to hardware components. Configuration and settings may also be changed frequently.

Because of the large number of components and the complexity both of individual components and the system as a whole, with many documented and undocumented interfaces between such components, errors sometimes occur. Errors may be in the form of software bugs, faulty hardware, incompatible components, improperly installed or configured elements, and other external conditions on which the system may depend. When errors occur, there is usually no IT staff around to repair them, and a long time may elapse before the owner is even notified that there is a problem. In the meantime, those that benefit from the devices are frustrated and underserved.

The foregoing discussion is intended only to illustrate the present field and should not be taken as a disavowal of claim scope.

SUMMARY

One advantage of embodiments consistent with the present disclosure includes the capability of using observations of the behavior (e.g., operating characteristics) or configuration of a managed computer system over time to develop a historic record and then using the historic record to determine when current behavior or configuration varies from the historic and alert of such variance and/or take remedial action.

In an embodiment, an apparatus for detecting and remediating an anomaly in a managed computing system is provided. The apparatus includes a data collection agent configured to collect original data over time associated with components and operation of the managed computer system; a monitoring and learning module configured to process the original data and generate a historic record that includes time-based data in respect of the components and operation of the managed system. The time-based data may comprise one or more time-based lists. The apparatus further includes an alert detection system comprising at least one alarm and at least one sensor, wherein the at least one sensor has associated therewith one of the time-based lists. The at least one sensor is configured to be set to an activated state when one or more associated sensor conditions are met, thereby detecting the anomaly. The at least one sensor is configured to determine when the at least one of sensor condition(s) is satisfied by evaluating the at least one time-based list along with a current value and/or state of the managed computer system. The apparatus may further include a remediation action module that is configured to effect one or more of a plurality of predetermined actions when the at least one sensor is activated.

Methods are also presented.

The foregoing and other aspects, features, details, utilities, and advantages of the present disclosure will be apparent

BRIEF DESCRIPTION OF THE DRAWINGS

FIG. 19 is a diagrammatic view of an average user input activity table for supporting the operation of a fifth sensor.

FIG. 21 is a diagrammatic view of a network activity table for supporting the operation of a sixth sensor.

DETAILED DESCRIPTION

Figure 1:
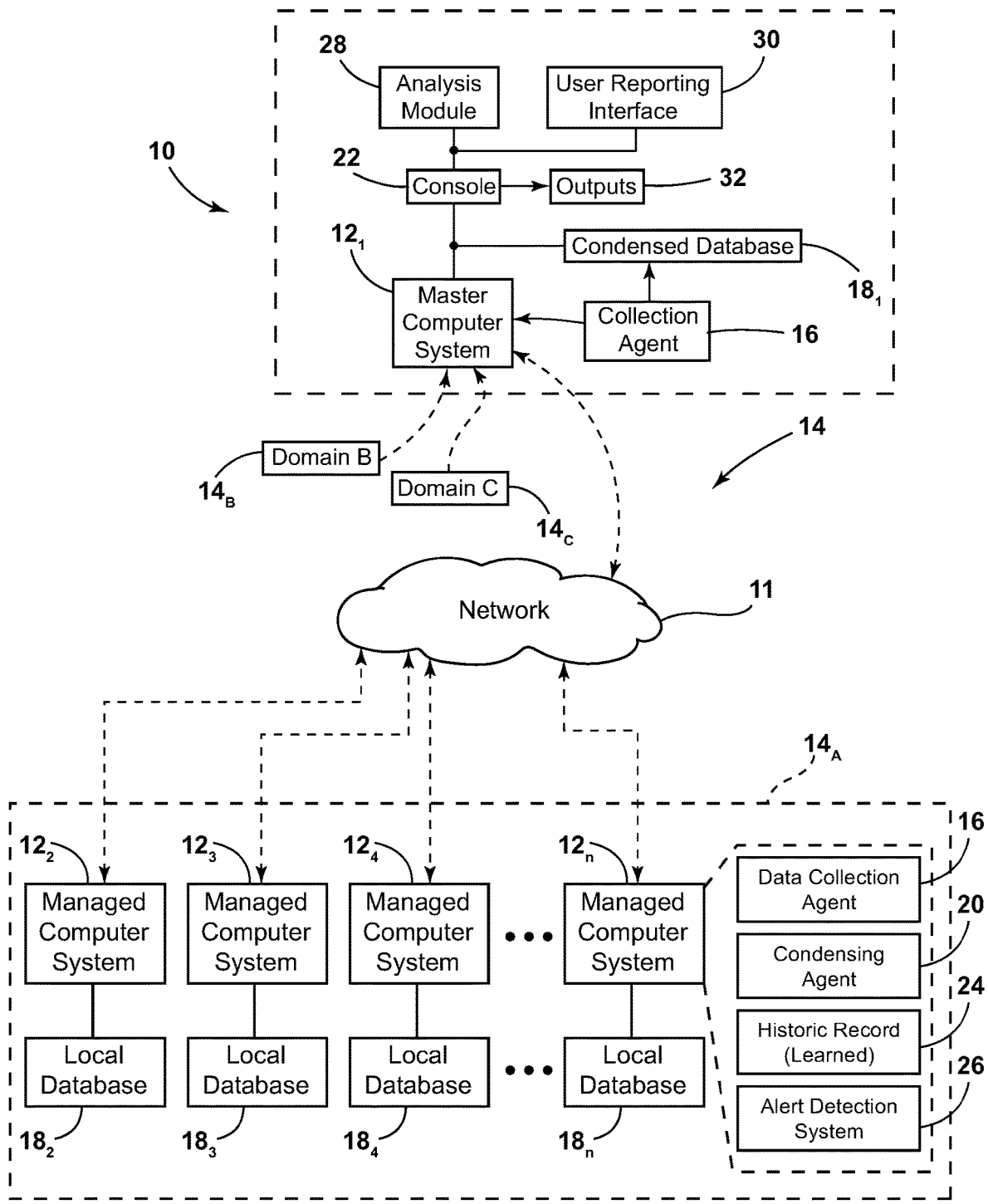
FIG. 1 is a diagrammatic and block diagram view of a distributed computing network in which embodiments consistent with the instant disclosure may be implemented.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Before proceeding to a detailed description, a general overview will be set forth. One object is to provide a self-contained, onboard error detection capability that can support arbitrary systems built from hardware components, firmware and software, applications that drive usage, attached devices, and configurations in a general sense. A goal is thus to provide a single system that can learn the expected behavior of the device and automatically report via self-diagnostics and/or remediate through various corrective actions. One or more embodiments consistent with the instant disclosure may be used on systems and components built and provided by others as a third-party element.

Embodiments consistent with the instant disclosure detect and, in some cases, remediate, problems, failures and/or anomalies arising in a managed computer system(s) such as computer-driven kiosks, informational displays, and other devices that operate computer software. Some such devices may accept no user input, merely driving displays that provide data and content to users; examples of which include a departure display in an airport, an advertising display in a hotel or taxi, or a welcome sign displaying a menu in a restaurant. Other such devices may accept user input, and perhaps include dispensers for printed output or other peripherals, examples of which may include without limitation various ordering kiosks in fast food restaurants, ticket machines in an airport or theme park, or information kiosks in convention centers.

One type of target devices may include those that are computer-driven, often but not always with a software application, and may not generally be attended by the same human over time, and furthermore may be provided by a party other than the one that wishes to monitor and maintain the device in operation.

Such embodiments may be configured to build a historical record that reflects how the managed computer system behaves in normal operation. Over time, the quality of that data continues to improve. Such embodiments may be configured to capture a wide variety of metrics that reflect the health, operation, resource consumption, dependencies on other components, extent of usage, detected errors and faults, and other data including both depth and breadth of data. Most metrics are time correlated such that the behavior can be determined by day of week and time of day, among other ways.

Such embodiments may be configured to track the behavior of the managed computer system, and to compare current behavior with the learned proper behavior (operation) that is determined over time (i.e., historic record). When a problem, failure, and/or an anomaly is detected, such embodiments may be configured to take remedial action, such as being configured to notify a party of the error, may take corrective actions, and/or may use the observed behavioral details and the nature of the problem to build a multi-device view that allows one to observe collections of such managed systems with such a view containing data suitable for detecting the trending of developing problems, predictive analytics, and/or centralized views of large numbers of devices.

In such embodiments, a user interface may be provided to construct and display the above-mentioned multi-device view—suitable for use by a user for review and analysis. Additionally and/or alternatively, a software module may be configured to construct the above-mentioned multi-device view(s) by way of automated analysis of such multi-device data.

Remedial actions such as notifications and/or corrective actions may be implemented by way of executed programmed scripts or programs. Additionally, the success of the remedial/corrective action may be tracked and used to alter the remedial/corrective action(s) and/or to perform alternative measures.

Such embodiments may further include mechanisms for updating the historical record (collection details), the detection logic that identifies faults (sensors), and the remedial/corrective actions taken over time. Such updates may result from observed behaviors, the results and success of actions taken, and/or other factors.

Referring now to the drawings wherein like reference numerals are used to identify identical components in the various views, FIG. 1 shows an illustrated embodiment of an apparatus 10 for detecting and possibly correcting problems, failures, and/or anomalies in a managed computer systems, such as kiosks, informational displays, and the like. In an embodiment, apparatus 10 may be employed in a distributed computing network, designated generally as network 14. The distributed computing network 14 may include a plurality of computer systems designated $12_1, 12_2, \ldots 12_n$ and may be of the type installed in one or more domains, such as Domain A, designated $14_A$, Domain B, designated $14_B$, and Domain C, designated $14_C$. In another embodiment, computer systems may not be part of any domain but remain connectable via a computer network. FIG. 1 also shows a communications network 11 through and over which one or more of the managed computer systems and the master computer system may communicate or otherwise transmit/transfer data/information.

The computer systems $12_1, 12_2, \ldots 12_n$ may be, but are not required to be, arranged in an hierarchical relationship wherein computer $12_1$ may be a top-level master node at a headquarters (HQ) or main location and hereinafter sometimes referred to as a master computer system $12_1$. In another embodiment, the top-level master node may be accessible via the internet in a cloud computing model.

The computer systems $12_2, 12_3, 12_4, \ldots 12_n$ may be kiosks, information displays, and other like devices that operate computer software—as mentioned above—although it should be understood that the present disclosure is not so limited and computer systems $12_2, 12_3, 12_4, \ldots 12_n$ may comprise workstation type computer systems or server type computer systems, or may be another type of computing device. The managed computer systems $12_2, 12_3, 12_4, \ldots 12_n$ may hereinafter sometimes be referred to as local or managed computer systems (also sometimes called a "child" computer system or alternatively a managed device). It should be understood that the number of managed computer systems shown in FIG. 1 is exemplary only and embodiments consistent with the instant disclosure are not so limited and may be applicable to a very large number of managed computer systems. Moreover, the managed computer systems are not limited to physically different hardware. Further descriptions of exemplary managed computer systems $12_2, 12_3, 12_4, \ldots 12_n$ may be found elsewhere in this document.

Each of the managed computer systems $12_2, 12_3, 12_4, \ldots 12_n$ may include (i) a respective data collection agent 16 (e.g., shown in exemplary fashion for managed computer system $12_n$), (ii) a respective local (or child) managed data store such as databases $18_2, 18_3, 18_4, \ldots 18_n$, (iii) a respective condenser module 20 configured to operate as a condensing agent 20, shown in exemplary fashion for managed computer system $12_n$, a respective historic record (learned behavior) 24, shown in exemplary fashion for managed computer system $12_n$, and a respective alert detection module or system 26, shown in exemplary fashion for managed computer system $12_n$.

The master computer system $12_1$ may include an optional console module 22, an analysis module 28, a user reporting interface 30, and an output block designated as outputs block 32, which in an embodiment may take the form of various reports and a presentation of one or more multi-device views of relevant data, such as for example only alarm data, sensor data, change management data, all of which may allow the detection of trending problems and predictive analytics.

The data collection agent 16 is configured to collect original data, which includes at least inventory data (e.g., data or information that is generally static in nature), operating data, and modified data, designated by reference numeral 38 (best shown in FIG. 2), which data is associated with various components and operation of a managed computer system $1Z$ (where i is 2 to n) with which the data collection agent 16 is associated. The collected original data may further include, without limitation, performance data, configuration data, hardware and software inventory data, as well as information about the relationships between various entities. In this regard, entities may include user names, application names, system names, domain names, disk names, network interfaces, and other items relevant within the workspace analytics system. The data collection agent 16 is also configured to record the captured data into a data store such as the local/managed databases $18_2$, $18_3$, $18_4$, ..., $18_n$.

Each local database $18_2$, $18_3$, $18_4$, ... $18_n$ may be associated with a respective one of the managed computer systems $12_2$, $12_3$, $12_4$, ... $12_n$. In an embodiment, the local databases $18_i$ (where i is 2 to n) may reside (i.e., where the data is saved) directly on the managed computer system $12_i$ with which it is associated, although it should be understand that the local databases may also be stored in shared storage, on a server, in a cloud storage facility, and/or in another place. In a typical embodiment, each of the local databases $18_i$ may be dedicated to its respective single managed computer system $12_i$ (or a single user thereof), although the sharing of such databases may also be possible.

The condenser module 20 is installed on each managed computer and is configured to operate as a condensing agent 20, including taking the original data/inventory data/modified data/other data stored in the local database $18_i$ as an input and performing a variety of operations designed to reduce its overall volume to produce condensed data. The condensing agent 20 is further configured to transmit the condensed data to an aggregation point, which may be the condensed database $18_1$.

The condensed database $18_1$ contains condensed data originating from the condensing agents 20 running on the managed computer systems $12_i$. The master computer system $12_1$ is configured (e.g., via software executing thereon) to receive such condensed data from the managed computer systems and may be configured to potentially operate on such received condensed data, and in any event stores it in the condensed database $18_1$. The condensed database $18_1$ itself may exist partially on storage systems and partially in the memory on the master computer system $12_1$. The condensed database $18_1$ includes, among other things, both real-time and historical data regarding alarm and sensor state(s) from the managed computer systems $12_2$, $12_3$, $12_4$, ... $12_n$, including at least sensor activation information from the managed computer systems.

The historic records 24 of each managed computer system $12_i$ provide various historical perspectives regarding the devices and operation of the managed computer system and are used in connection with the various sensors described below.

The alert detection system 26 comprises a collection of alarms and sensors and may be installed on each managed computer system $12_i$. In an embodiment, a number of sensors included in system 26 are configured to use the historic record(s) 24, along with current data/values, and optionally predetermined data, to determine whether or not to activate such sensors.

The analysis module 28 is associated with the master computer system $12_1$. The analysis module 28 may be configured to perform a number of statistical operations and has been configured with analytics capabilities configured to take data contained in the condensed database $18_1$ as input and generate various outputs 32 such as the multiple-device view mentioned above.

As an example of a multi-device view, the analysis module 28 may categorize devices by the types of problems detected, thereby allowing an operator to identify which problems impact the most devices. As another example, the analysis module 28 may detect trends of devices newly impacted by a particular problem to identify changes that cause failures.

The user reporting interface 30 generally allows the user to interact with the analysis module 28 in order to generate various reports (output 32) and retrieve other relevant information.

Figures 2, 3:
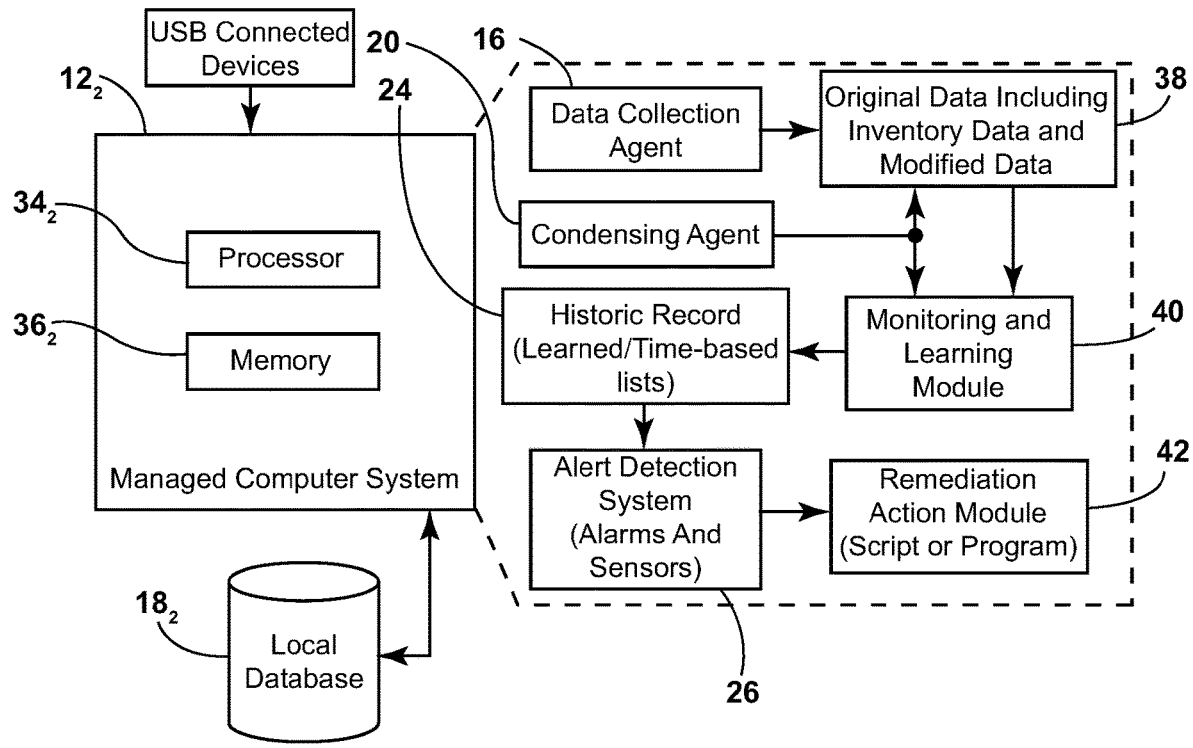
FIG. 2 is a diagrammatic and block diagram view showing, in greater detail, an embodiment of the managed computer system of FIG. 1.
FIG. 3 is a table view showing, in greater detail, a plurality of alarms as shown in block form in FIG. 2.

FIG. 2 is a diagrammatic and block diagram view showing, in greater detail, aspects of apparatus 10 as implemented in an exemplary managed computer system (e.g., managed computer system $12_2$). In the illustrated embodiment, managed computer system $12_2$ includes an electronic processor $34_2$ and an associated memory $36_2$. The apparatus 10 is configured generally to collect original data relating to and associated with the managed computer system $12_2$, substantially constantly evaluate a collection of alarms and sensors (collectively the "alerts") and determine and record what alert(s) have been activated.

The processor $34_2$ may include processing capabilities as well as an input/output (I/O) interface through which processor $34_2$ may receive a plurality of input and generate a plurality of outputs. Memory $36_2$ is provided for storage of data and instructions or code (i.e., software) for processor $34_2$. Memory $36_2$ may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM).

Memory $36_2$ stores executable code which when executed by the processor $34_2$ performs a number of functions as described herein for the apparatus 10, including code to perform the data collection agent 16 functionality (as described herein), code to monitor and learn the behavior of the managed computer system and build an historic record 24 (as described herein), and code to perform the alert detection system 26 functionality particularly the evaluation for the plurality of sensors (as described herein). These and other functions described herein may together contribute to the overall performance of the method and apparatus for detecting and correcting failures, problems, and/or anomalies in kiosks, information displays, and the like. The managed computer systems $12_2$, $12_3$, $12_4$, ... $12_n$ will also include an operating system (not illustrated) where the managed computer system may be a Windows-based computer, macOS-based computer, a Linux-based computer, a mobile phone, a kiosk, a special purpose handheld device such as barcode scanner, an Android-based computer, ChromeOS based computer, and IOS based devices, and/or other computing devices. The managed computer systems $12_2$, $12_3$, $12_4$, ... $12_n$ may further include application programs suited in function and operation to the purpose(s) for it has been developed and deployed.

The data collection agent 16 is configured to monitor and collect many types of information, including without limitation performance data, configuration data, hardware and software inventory data, system health, connectivity including network connectivity, computing resource availability and usage, information about the relationships between various entities, as well as other information. This information is collectively designated at box 38. Most types of data collected by agent 16 are time-stamped when saving to allow time correlation analysis and for other purposes as described herein. It should be understood that the data collection agent 16 on each managed computer system $12_i$ gathers information that may be relevant for many different purposes. In an alternative embodiment, the local data store may be present on external storage or another computing system.

The data collection agent 16 may be configured in an embodiment to use various operating system application programming interfaces (APIs), access various existing collections of data of interest, and perform various direct observations of user, application, system activity, peripheral, hardware, software, and other aspects of operation. In an embodiment, the data collection agent 16 is configured to operate as a software service on the managed computer system, and may be configured to operate continuously. The data collection agent 16 may be further configured to directly record such captured data/observations (i.e., the original data 38) in the local data store (i.e., associated local database 18), and/or be configured to perform first-level analytics on the data to make decisions about what to save and/or perform various functions, such as mathematical transformations, on the observed/collected data (modified data).

The data collection agent 16 may be configured (i) to operate as a system service directly on a managed computer system $12_i$; (ii) to operate substantially continuously; and (iii) to operate autonomously with respect to the master computer system and with respect to other managed (monitored) computer systems, which may have advantages for scale, mobility, cloud, and privacy. In an alternative embodiment, the data collection agent 16 may be configured to operate remotely from the managed (monitored) computer system.

In an embodiment, the data collection/analysis functionality that is performed by the data collection agent 16 may be implemented, at least in-part, by one or more components of a workspace analytics system, which may be a commercial product available under the trade designation SYSTRACK from Lakeside Software, LLC, Bloomfield Hills, Mich. USA, as mentioned above.

The condenser module (agent) 20 runs periodically on the managed computer system. The condenser module 20 is configured to take the original/inventory data/other data contained in the local database (e.g., database $18_2$) as an input and, in an embodiment, perform a variety of operations designed to reduce the volume of the data and/or create mathematically interesting analysis of that data. The condenser module 20 is further configured to send the condensed data to an aggregation point called the condensed database $18_1$, which data may include alarm and sensor (activation) data. The condenser module 20 is configured to run on the managed computer system $12_i$ at predetermined times (e.g., periodically) and/or at different time schedules for different types of data so as to provide flexibility to the implementation, and/or may be triggered to run upon demand by the master computer system $12_1$ and/or signaled by another external system. The condensed database $18_1$ contains data from many managed computer systems—such data being collectively sent to it via the respective condensors 20. The condensed database $18_1$ itself may exist partially on storage systems and partially in memory on the master system $12_1$. The condensed database $18_1$ includes both real-time and historical data regarding alarm and sensor state from the managed computer systems.

The monitoring and learning module 40 is configured to process the data 38 and to create (and thereafter update as warranted) the historic record 24 that is associated with the components, operation, and configuration of the associated managed computer system 1Z. The contents of the historic record 24 reflect the components, operation, and configuration of the managed computer system $12_i$ over time including the learned behavior of the operation thereof. The historic record 24 includes time-based data in respect of the components, operation, and configuration of the managed computer system $12_i$, which may comprise one or more time-based lists. In embodiments, such lists may contain a single column and/or multiple columns so as to form time-based tables.

The alert detection system 26 comprising alarms and sensors (collectively "alerts") are installed on each managed computer system $12_i$ and configured to detect the occurrence of one or more alerts associated with the managed computer system $12_i$. The alert detection system 26 then may record the one or more detected alerts as alert records in the local database $18_i$. As used herein, an alert comprises at least one of an alarm and a sensor and each alert can assume either an active or an inactive state. Each detected alert may therefore comprise at least one of an activated alarm or activated sensor. In an embodiment, at least one sensor is responsive to first data that is drawn from the historic record 24, second data corresponding to current (or current-time) data values associated with the components/operation/configuration of the managed computer system, and possibly third data comprising, for example only, threshold data or the like.

In one embodiment, the alert detection system 26—the alarms and sensors included thereunder, is configured to detect the occurrence of one or more alerts associated with the managed computer system on which it is installed. In a different embodiment, however, the alert detection system 26—the alarms and sensors included thereunder, could be implemented on a different computer system linked via appropriate networking capabilities to the managed computer system being monitored. In some embodiments, one or more of the sensor activations may include time-duration information. Such alert records (e.g., activated sensors) are stored in the local database $18_i$.

The alert detection system 26 is configured to allow the definition of, for each alarm, a respective one or more alarm conditions to be associated therewith, wherein each alarm is triggered (activated) when the monitored alarm condition(s) occurs. The alert detection system 26 is also configured to allow the definition of, for each sensor, a respective one or more sensor conditions to be associated therewith, wherein each sensor is configured to monitor and makes decisions about whether a particular kind of problem, failure and/or anomaly exists (i.e., the sensor being triggered or activated when the monitored sensor condition(s) and/or trigger events occur and/or are deemed satisfied).

As described in greater detail below, a sensor may be defined by an algorithm that compares measured values with expected parameters, historical behavior, and other metrics. For example, a defined sensor might be configured to monitor and then detect when an application program is consuming too much in the way of CPU resources, or that no successful input was received over a prescribed period of time. For example, a threshold percentage of CPU utilization may be defined in advanced or learned from past behavior learned and stored in the local database. In a constructed embodiment, there are approximately 100 alarms and 1200 sensors, although it should be understood that in any particular embodiment, the actual number of alarms and/or sensors may vary. It is also possible to augment these with additional capabilities over time.

In an embodiment, the alarm detection functionality may be programmed into a managed computer system, while the sensor detection functionality may be dynamically updated and added so as to increase the coverage of any detectable problems, failures, and/or anomalies. Each alarm and/or sensor is either in an activated state (if it detects a problem) or an inactivated state (if no such problem is detected). The data collection agent 16 may be configured to capture the state of the alarms and sensors, and records such activated alarms and sensors (e.g., as alert records) in the local database 18$_i$ which may contain not only the sensor activation identification itself, but associated information such as when and for how long. In a constructed embodiment, the alert detection system 26 may be configured to check/evaluate alarms at predetermined (configured) time intervals (e.g., every fifteen seconds) and check/evaluate sensors at predetermined (configured) time intervals (e.g., update every five minutes), although it should be understood that the above-mentioned timing is exemplary only and that adjustment of these values is possible. The sensor evaluation/assessment time interval(s) may be configured to approximate real-time.

Additionally, sensors have a notion of inapplicability, for example, a sensor that monitors conditions on a virtualized computer system may not be evaluated on a physical computer system, as the underlying conditions can be irrelevant. Additionally, any number of sensors may be defined, each sensor designed to detect a particular type of problem condition. Sensors according to the instant disclosure can leverage historical data, comparing current behavior with the past. In embodiments involving historical data 24, for many types of kiosk devices, it is useful to compare past data correlated by day of week and time of day, as many people-related behaviors exhibit periodicity on a weekly basis. An example of such may be ordering activity at a fast food kiosk, where "Monday between 10 and 11 AM" may exhibit such recurring behavior.

With continued reference to FIG. 2, the remediation action module 42 is configured to effect the performance of one or more of a plurality of predetermined actions in response to a sensor activation(s), as described below in greater detail in connection with FIG. 8. The remediation action module 42 may include a script or program configured to effect such predetermined actions.

FIG. 3 is a table 46 showing a plurality of alarms as may be included in alert detection system 26. As noted above, an alert may comprise either or both of an alarm and/or a sensor. Alarms may be defined by relatively straightforward detection mechanisms, typically either driven by a single event or driven as a measured value exceeding a configured threshold for a period of time. For example, an alarm no. 1 (i.e., the first row of the table 46 in FIG. 3) has a defined alarm condition corresponding to the occurrence of a first event designated EVENT-1. As further shown, alarm no. 1 is currently shown in an active state. Also, to the extent the alarm has any applicability conditions that are a prerequisite to be satisfied, this is defined generally in the table as AC-1. As a further example, an alarm no. 2 is defined to have an alarm condition (trigger) which is satisfied when a measured value exceeds a threshold value (e.g., M.V>TH). As further example, alarm no. n has an associated alarm condition (trigger) corresponding to the occurrence of Event-2 (i.e., which may be different than the Event-1 associated with alarm no. 1), and also has a different applicability condition(s) (e.g., AC-2).

Figures 4, 5:
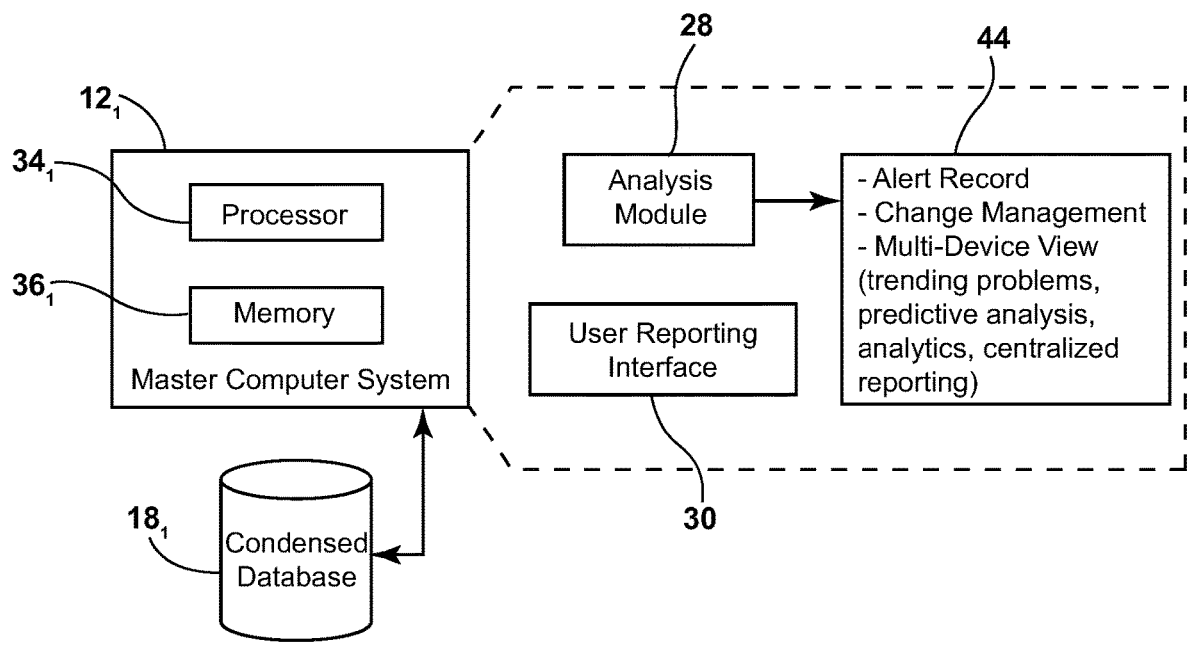
FIG. 4 is a table view showing, in greater detail, a plurality of sensors as shown in block form in FIG. 2.
FIG. 5 is a diagrammatic and block diagram view showing, in greater detail, an embodiment the master computer system of FIG. 1.

FIG. 4 is a table 48 showing a plurality of sensors as included in the alert detection system 26. In an embodiment, each sensor has an associated algorithm, which is determined by a person (e.g., an engineer) in advance and delivered to/installed on the managed computer system. Sensors, in contrast to alarms, therefore may be configured to be more flexible and potentially include more complex logic compared to alarms, and which may comprise precise logic, fuzzy logic, or other learning techniques, and may take as inputs an array of observable real-time conditions measurable on the managed computer system, historical content previously captured and saved into the local database, configuration settings, variables which are inputs to the sensor algorithm, and potentially other factors. A particular sensor algorithm may therefore be configured to allow for the detection of complex conditions using an array of conditions, logic, artificial intelligence (AI) techniques, and the like. Sensors may be simple or complex, constructed from connecting and enhancing other sensors. The overall set of sensors operated by a managed computer system may be changed over time via configuration.

For example, the sensor no. 1 in FIG. 4 (i.e., the first row of the table 48) has associated therewith three defined sensor conditions, such sensor conditions corresponding to the occurrence of a first event EVENT-1, the occurrence of a second event EVENT-2, and a satisfied condition where a measured value is greater than a predetermined threshold (e.g., M.V.>TH). The state of the sensor no. 1 in table 48 is currently INACTIVE, and an applicability criteria is defined as a first applicability criteria, designated AC-1 (e.g., Is the managed computer system a physical system, compared to a virtualized system?). Both alarms and sensors may be evaluated by the alert detection system 26 based on predetermined, specific configured time intervals, which values may be selected so as to approximate real-time monitoring, in an embodiment.

Various sensors described herein are defined that can compare observed behavior with historically learned behaviors from the past. When new problems develop, it is typical that current behavior varies from the past behavior and such sensors are configured to detect such variance and thus the presence of problems, failures, and/or anomalies (i.e., abnormal conditions). If so configured, embodiments of the remediation action module 40 may invoke corrective actions in the form of scripts or programs in response to detected conditions.

Some sensors may detect behaviors that are known a priori to be incorrect. For example, it is known in advance that the local storage on the device should not exceed 90% full. Other sensors may detect learned behaviors that are incorrect. For example, it may be determined to be a likely error condition when a fast food ordering kiosk detects zero orders during a Monday lunch period when it normally processes many such orders in past weeks.

The alert detection system 26—the alarms and sensors thereunder—via the data collection agent 16 is configured to record the state of both alarms and sensors in the local database 18$_i$, as shown in FIGS. 3-4 in the "STATE" column. During operation, the condensing agent 20 may be configured to send the state(s) of the alarms/sensors to the condensed database 18$_1$ and such data may be sent on preconfigured time intervals or on an event-driven interval basis, and may be triggered as a result of the state of the alarm or sensor itself, in an embodiment. It should be appreciated that alarms and sensors have a notion of being activated or on, or deactivated or off.

In one embodiment, the performance of the analytics necessary to operate alarms/sensors may be performed by the data collection agent 16—it can be implemented as one of its built-in functions, even though the alert detection system 26 is shown as separate block. The alarm evaluation/detection part happens as data is collected by the data collection agent 16, while the sensors part are evaluated on a programmed time period. Both are integral parts of the data collection agent process. The data collection agent 16 thus can be configured to evaluate the alarms and sensors. The alarm part of the alert detection system 26 can therefore be a built-in feature of the data collection agent 16, except for configurable thresholds. The sensors in contrast may be purely a configuration that is downloaded and processed, for example, by general-purpose sensor processing code in the data collection agent 16. So sensors (i.e., newer technology) can be more flexible as they are field configurable. It should be appreciated that the foregoing merely describes one embodiment. An alternative embodiment is to configure the alert detection system (i.e., operate the alarms and sensors) remotely on another computer system that is configured to access the local data store, or to use a central data store and central alarm/sensor processing ability. In this alternative embodiment, it would still be per-system in concept, but performed from a central location.

FIG. 5 is a simplified diagrammatic and block diagram view showing aspects of the apparatus 10 as implemented in the master computer system $12_1$. In the illustrated embodiment, the master computer system $12_1$ includes an electronic processor $34_1$ and an associated memory $36_1$. The processor $34_1$ may include processing capabilities as well as an input/output (I/O) interface through which processor $34_1$ may receive a plurality of input and generate a plurality of outputs. Memory $36_1$ is provided for storage of data and instructions or code (i.e., software) for processor $34_1$. Memory $36_1$ may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM).

In an embodiment, memory $36_1$ stores executable code which when executed by the processor $34_1$ performs a number of functions as described herein for the apparatus 10, for example, code to perform the analysis module 28 functionality as described herein and code to perform the user reporting interface 30 functionality as described herein and produce the described output(s) 32. The master computer system $12_1$ has associated with therewith, additionally, software that receives condensed data and that may potentially operate on such data and further stores it in the condensed database $18_1$. The condensed database $18_1$ contains data from many managed computer systems $12_i$—such data being collectively sent to it via the respective condensors 20. The condensed database $18_1$ itself may exist partially on storage systems and partially in memory on the master computer system $12_1$. The condensed database $18_1$ includes both real-time and historical data regarding alarm and sensor state(s) relating to the managed computer systems.

The master computer system $12_1$ will include (1) an operating system (not illustrated) where the master computer system may be a Windows-based computer, macOS-based computer, a Linux-based computer, Android, ChromeOS, or IOS based devices, and (2) may include application program(s) suited in function and operation to the purpose(s) of the user(s) of the master computer system $12_1$. The master computer system may be embodied in a per-system-collection "on premises" solution, or may be embodied in a cloud-delivered solution.

The user reporting interface 30 is configured to allow the user to interact with the analysis module 28 in order to generate various reports and obtain other information. As illustrated, such reporting may include alarm or sensor data, change management data, and/or multi-device views (i.e., relating to the plurality of managed computer systems) that may facilitate the identification of trending problems, failures, and/or anomalies and/or allow predictive analytics.

The software analysis module 28 is associated with the master computer system. This module performs many statistical and analytics capabilities, taking data in the condensed database $18_1$ as input. The module 28 is capable of accessing alarm data, sensor data (e.g., sensor activations), and change management data, each of which may be found in the condensed database $18_1$.

Figure 6:
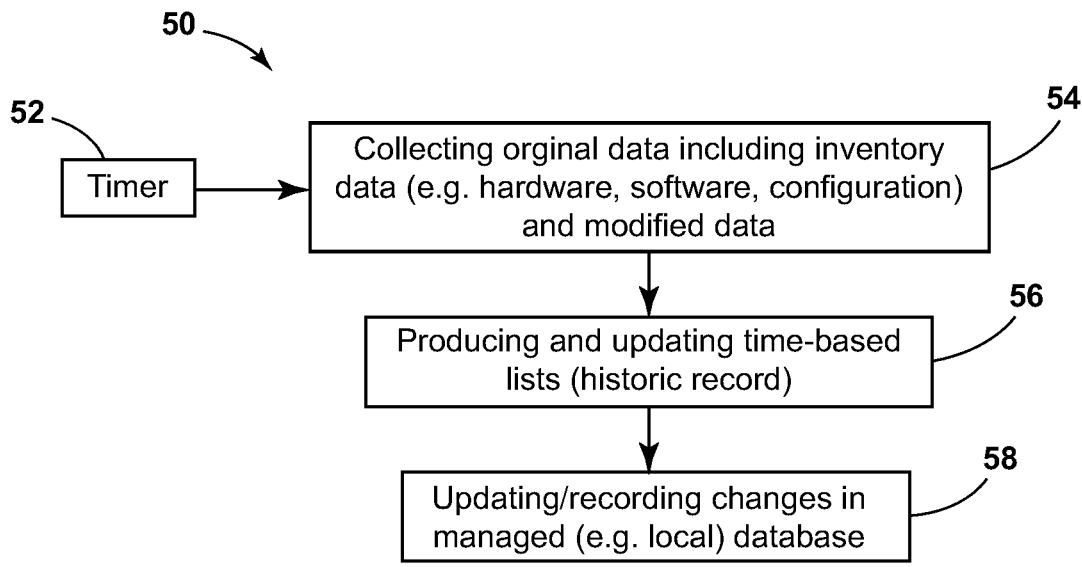
FIG. 6 is a flowchart showing the operation of the data collection agent and the monitoring and learning module block in the managed computer system of FIG. 2.

FIG. 6 is a flowchart showing, in an illustrated embodiment, a method 50 of the operation of the data collection agent 16 and the monitoring and learning module 40, both as included in a managed computer system $12_i$. The method begins in step 54.

At step 54, at predetermined times, as determined for example by a timer 52, the data collection agent 16 collects original data including inventory data (e.g., hardware, software, configuration data, etc.) and optionally modified data over time associated with the components, operation, and configuration of the managed computer system $12_i$. The data collection agent 16 may be configured to gather information related to performance, configuration, inventory, health, connectivity, computing resources, and other information. The apparatus 10 is configured to leverage knowledge gained through analysis of a large collection of information obtained from such managed computer systems $12_i$ in order to make its evaluations and outputs, as described herein. It is contemplated that there will be many such managed computer systems, and thus it should be understood that the method 50 is not limited to a single managed computer system and may be performed on a plurality of such managed computer system $12_i$ in the network 14. In certain embodiments, the contemplated target managed computer systems may be of the type that includes kiosks, informational displays, and other devices that are often unattended, although it should be understand that application of the instant disclosure is not so limited to such device (e.g., desktops, notebooks, laptops, mobile devices, and other endpoints and server platforms). The method proceeds to step 56.

In step 56, the monitoring and learning module 40 is configured to process the original and other data in the local (managed) database and generate a historic record 24 associated with the components, operation, and configuration of the managed computer system $12_i$. The historic record 24 may include time-based data with respect of such components, operation, and configuration of the managed computer system $12_i$ and the time-based data may comprise one or more time-based lists in certain embodiments. Such time-based lists may be single column lists, tables (i.e., a plurality of rows and columns), or any other structure(s) for organizing the time-based data, examples of which in various embodiments are described hereinafter. It should be understood that step 56 may create such list(s) as an initial matter and update such list(s) if they have already been created. The method proceeds to step 58.

In step 58, the monitoring and learning module 40 is configured to update or otherwise record the results of step 56 in the managed (local) database $18_i$ of the associated managed computer system $12_i$. Through the foregoing method 50, the apparatus is able to build a knowledge base of the managed computer system's behavior.

Figure 7:
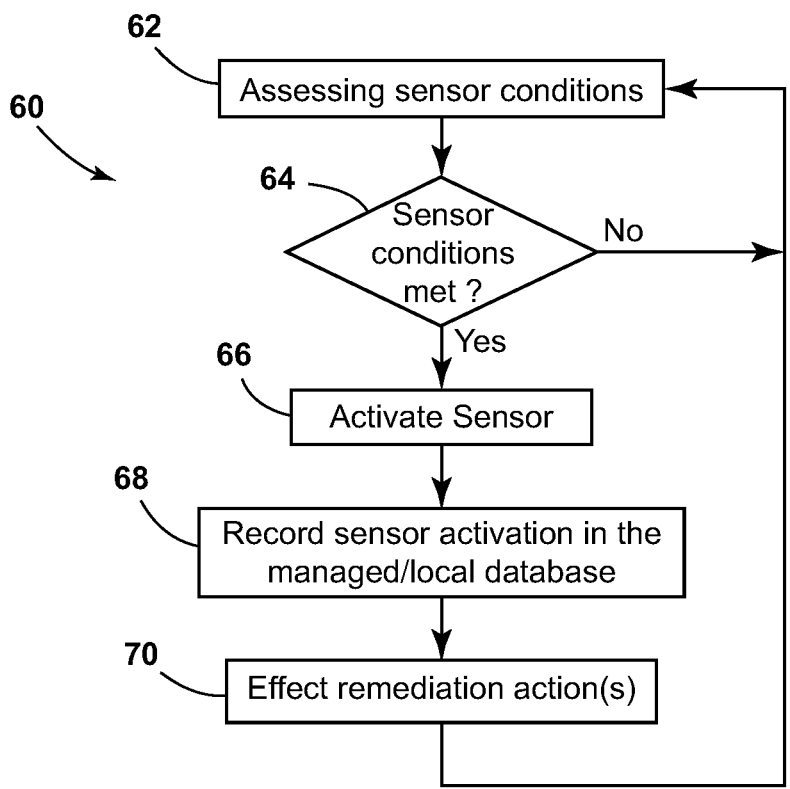
FIG. 7 is a flowchart showing the operation of the sensors included in the alert detection system block in the managed computer system of FIG. 2.

FIG. 7 is a flowchart showing a method 60 of the general operation of the collection of sensors included in the alert detection system block 26. As mentioned above, concurrently with its other operations, the data collection agent 16 causes alarms and sensors to be evaluated via the alert detection system block 26. It should be understood that the alert detection system 26 includes at least one sensor that evaluates sensor(s) conditions with respect to time-based data and/or learned data and the flowchart of the method 60 pertains to this at least one sensor. However, it should be appreciated that any managed computer system may have a plurality of such sensors and that the flowchart applies to such sensors. The method begins in step 62.

In step 62, the alert detection system 26 is configured to assess sensor condition(s) associated with the at least one sensor mentioned above. In an embodiment, the at least one of the sensor has associated therewith one of the time-based lists of historic data 24, and wherein the at least one sensor is configured to be set to an activated state when the associated sensor condition(s) are met, which may include one sensor conditions but may include a plurality of sensor conditions. Through this assessment, the managed computer system 1Z is enabled to detect a problem, a failure, or an anomaly therein. After the assessment step 62, the method proceeds to step 64.

In step 64, the operation of the at least one sensor determines if its associated sensor condition(s) have been satisfied by evaluating the information contained in the time-based list in connection with at least a current time value (e.g., drawn from the original data), and potentially predetermined data such as threshold data. If the at least one sensor determines that the associated sensor condition(s) have not been met (i.e., if the answer is NO), then the method branches back to step 62 (i.e., continues assessing sensor conditions). However, if the answer is YES, then the method proceeds to step 66.

In step 66, the at least one sensor included in the alert detection system 26 is configured to set the state of the sensor, as assessed in step 62, to an activated state. The method proceeds to step 68.

In step 68, the at least one sensor included in the alert detection system 26 is configured to record the new state (i.e., active state now versus inactive state before) in the managed (local) database $18_i$. The sensor activation may also be sent to the condensed database $18_1$ through the operation of the condensing agent 20 in due course time, for example, on configured intervals, on an event driven interval, and/or may be triggered as a result of the state of the alarm or sensor itself. The method proceeds to step 70.

In step 70, the remediation action module 42 is configured to effect one or more predetermined redial actions, as associated with the sensor in advance. The method proceeds to step 62 where the method repeats.

Figure 8:
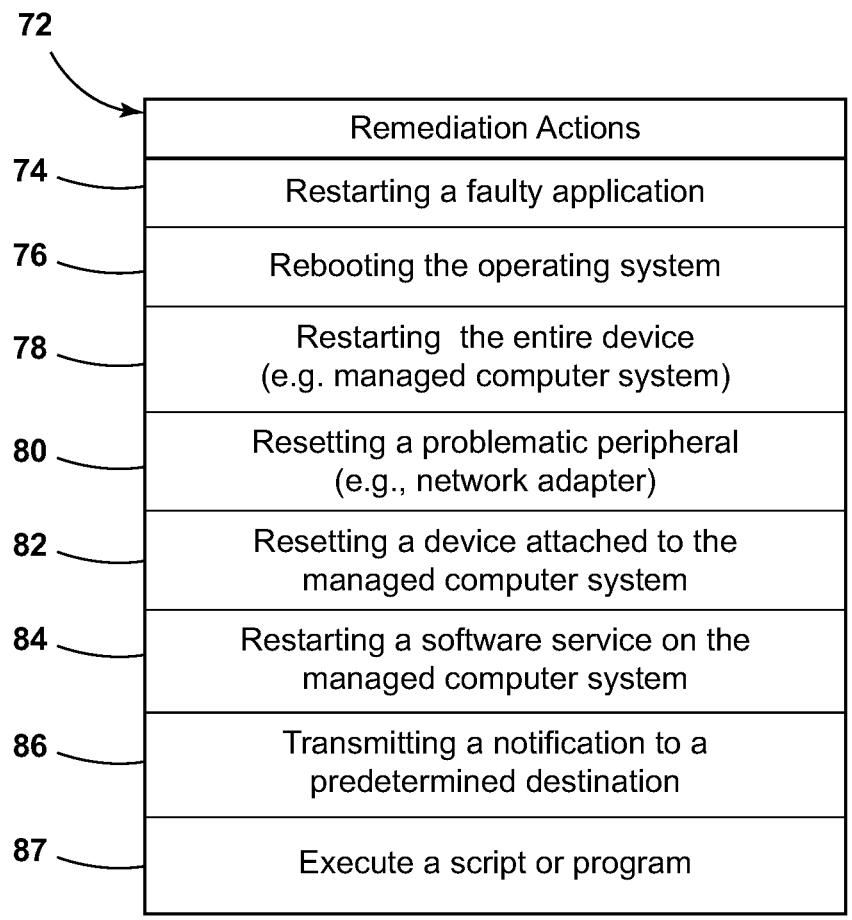
FIG. 8 is a table showing a plurality of remedial actions that may be taken by the remediation action module of FIG. 2.

FIG. 8 is a view of table 72 which lists various remediation action(s) that the remediation action module 42 may be configured to take when a particular sensor is activated. It should be appreciated that it sometimes possible to automatically remediate problems, failures, and/or anomalies by the invocation of an action. Examples of corrective actions include the restarting of a faulting application (reference numeral 74), the rebooting of the operating system (reference numeral 76), the restarting of the entire device, such as the managed computer system (reference numeral 78), the resetting of a problematic peripheral such as a network adapter (reference numeral 80), the resetting of a device attached to the managed computer system (reference numeral 82), the restarting of a software service on the managed computer system (reference numeral 84), the transmitting of a notification to a predetermined destination such as a help desk or a human via various means (reference numeral 86), and, generally, execution of a script or a program (reference numeral 87). This listing is exemplary only and not limiting in nature.

In addition, the role of initial detection warrants emphasis. In conventional practice there is little automated problem, failure, or anomaly detection and thus such problems, failures, and anomalies that do occur on kiosks, informational displays, and the like are never discovered at all or are discovered only after a long period of time has elapsed since the problem began. And while in some cases, certain applications may have built-in diagnostics for their own applications, these tend to be very rudimentary and unsophisticated, and lack any system context and lack any leverage of historical behavior for comparison. Such conventional diagnostics are thus by their nature application-specific and therefore unsuitable for any operator that manages multiple different such devices. Accordingly, while embodiments consistent with the instant disclosure provide a plurality of remediation actions, in many cases, remediation depends on detection of the problem in the first instance. Without sufficient detection of developing conditions/problems, no remediation action may be attempted.

Figure 9:
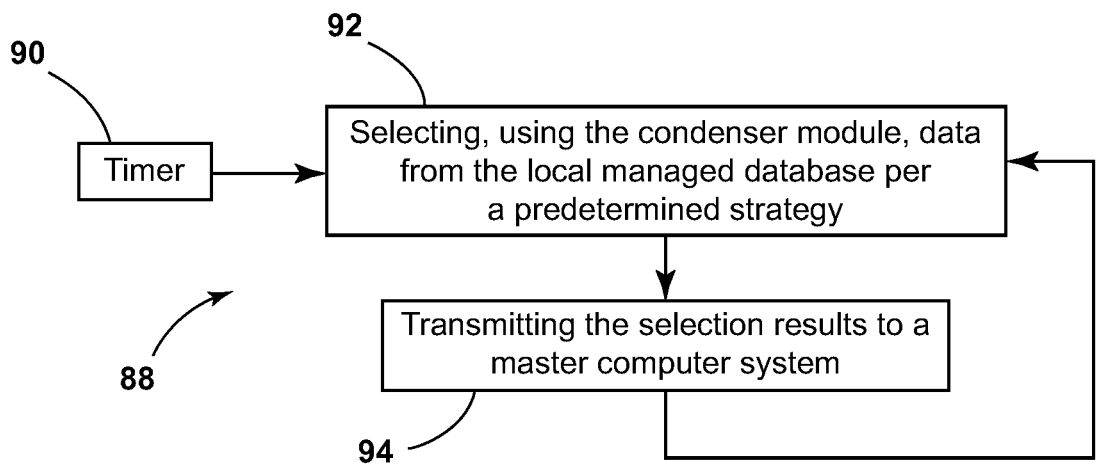
FIG. 9 is a flowchart showing the operation of the condenser agent of FIGS. 1 and 2 selecting information from the local database (e.g., sensor activation(s)) and transmitting the selected information to the master computer system.

FIG. 9 is a flowchart showing a method 88 of the operation of the condenser agent 20. The method 88 begin with the initiation by and operation of a timer 90. The timer 90, which may be pre-configured to cause, at predetermined times, the method 88 comprising steps 92 and 94 to be executed.

In step 92, the condenser agent 20 is configured to select information from the collected data 38 contained in the local database (e.g., sensor activations) according to a predetermined strategy. In an embodiment, selected information includes at least the sensor activations contained in the managed (local) database. The method proceeds to step 94.

In step 94, the condenser agent 20 is configured to transmit the information selected in step 92 to the master computer system $12_1$. As described above, the master computer system $12_1$ may directly store the received information in the condensed database $18_1$ or alternatively may initially process the received information and then store it in the condensed database $18_1$. The method 88 then returns back to step 92 and await further initiation from timer 90.

Figure 10:
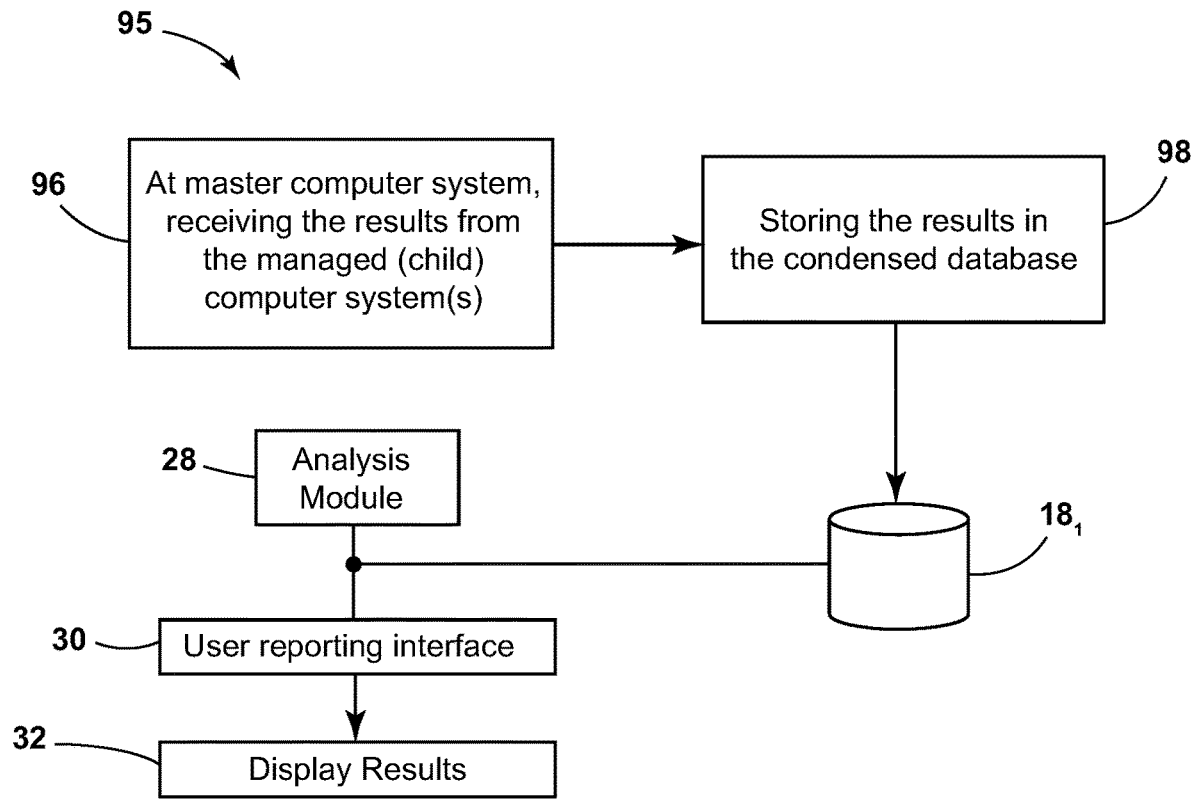
FIG. 10 is a flowchart and block diagram showing receipt of the upstream flow of selected information (e.g., sensor activations) for storage and processing in the master computer system.

FIG. 10 is a flowchart and block diagram showing a method 95 reflecting the operation of the master computer system $12_1$ in the apparatus 10. The method begins in step 96.

In step 96, the master computer system $12_1$ is configured to receive the selected data and/or selection results from one or more managed (child) computer system(s) $12_2$, $12_3$, . . . , $12_n$, wherein such data/results originate and are flowing upstream by operation of the respective condenser modules 20 (see FIG. 9 for operation of the condenser module). It should be understood that even though the method 95 shows just one block receiving information from one managed computer system, it is contemplated that the method will be performed with respect to a plurality of managed computer systems, with the resultant inbound data from the condensing agents 20 being collectively received in block 96. The method 95 then proceeds to step 98.

In step 98, the master computer system $12_1$ is configured to store the received data/results in the condensed database $18_1$ for further processing. As mentioned, the master computer system $12_1$ may alternatively process the received data prior to storing. Overall, steps 96/98 reflect a general upstream flow of selected information, such as sensor activations for storage and processing in and by the master computer system $12_1$. As also shown in FIG. 10, the analysis module 28 and the user reporting interface 30 are in communication with the condensed database $18_1$ and can access and retrieve information stored therein. As a result of the aggregation of alert data, particularly sensor activation(s) as described herein, a broader perspective of the operation of the plurality of managed computer systems may be made by the analysis module 28 (e.g., obtained from analyzing the data from a large body of accumulated information).

With the foregoing description having been made, a detailed description of a plurality of sensors will now be made where such sensors are configured to detect and remediate problems, failures, and anomalies in a managed computer system. It should be understood that the following is exemplary only and not limiting in nature.

Figure 11:
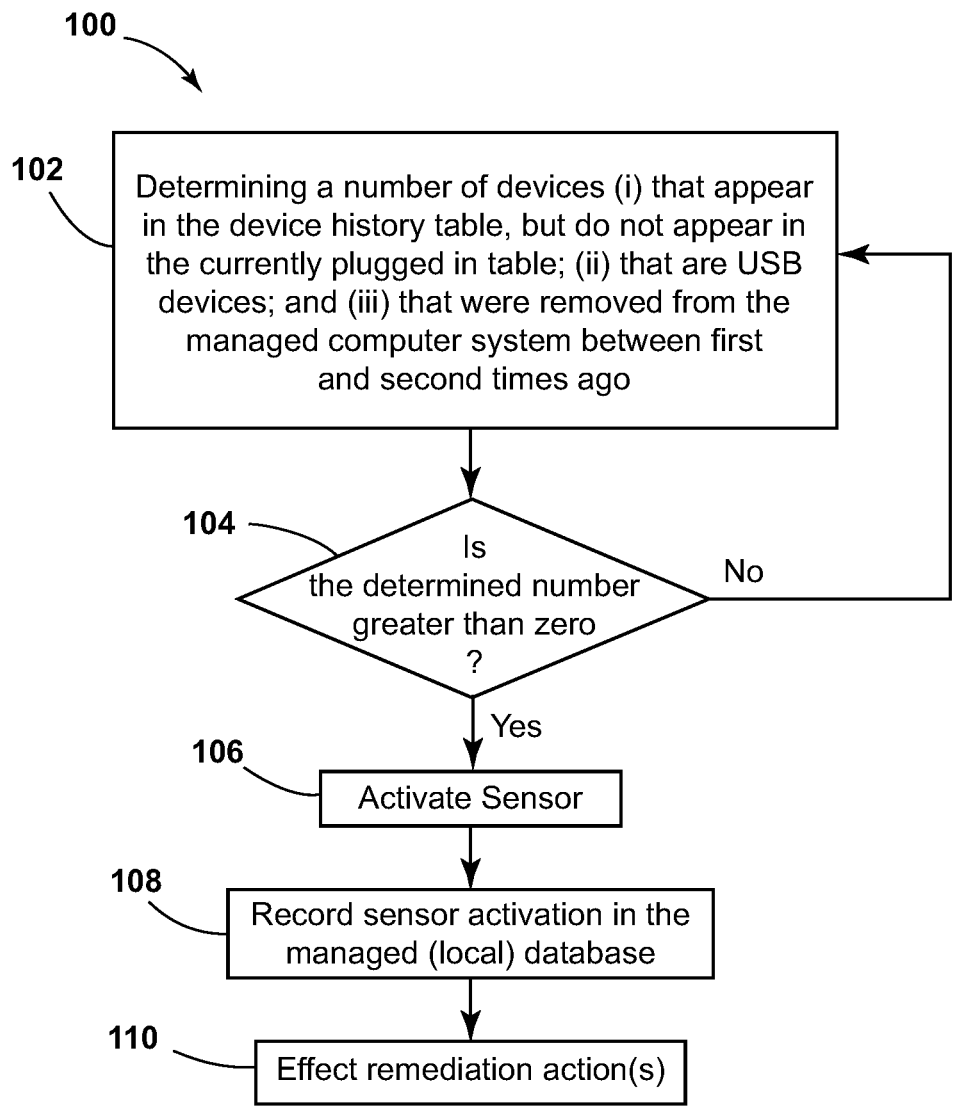
FIG. 11 is a flowchart showing the operation of a first sensor configured to detect when a USB device has become disconnected.

USB Device Disconnected. FIG. 11 is a flowchart showing a method 100 of the operation of an embodiment of a first sensor, namely, a universal serial bus (USB) device disconnection (detection) sensor. In an embodiment, the managed computer system $12_i$ including this sensor will include a mechanism to monitor, detect, and record the activity with respect to USB-connected devices (see, e.g., FIG. 2 showing in block form "USB Connected Devices"). For example only, such USB-connected device(s) may comprise generally user input devices, such as a keyboard, a mouse, or the like, although it should be understood that in a kiosk embodiment, a touch-screen may be provided that presents to the operating system as a keyboard and/or mouse and may include its own driver. A rationale here is that when a relatively permanently connected USB device becomes disconnected, there is likely a problem. Disconnection may be either physical or logical via software. The method begins in step 102.

In step 102, the sensor via the alert detection system 26 assesses the predetermined conditions for the first sensor including evaluation of the pre-programmed logic. In other words, the first sensor is configured to be activated when its predetermined sensor conditions have been satisfied. The operation of the first sensor determines the following: a number (e.g., integer) of USB-connected device(s) (i) that appear in a device history table but do not appear in a currently plugged in device table; (ii) that are USB devices, as opposed to other device types; and (iii) that have the status as being connected to (plugged into) the managed computer system during a first lookback period but have been further determined to have been removed and have remained removed from the managed computer system for more than a predetermined removal-time threshold. For example, this first sensor is activated when a USB device that was plugged into the managed computer system at some point over the last seven days (i.e., during the first lookback period) is then removed and has remained unplugged for over ten minutes (i.e., a predetermined removal-time threshold). If the USB device is plugged back in, however, the sensor deactivates.

In an embodiment, the first sensor is configured generally to compare a first table of all devices that have been removed from the managed computer system (see Table 2) against a second table of all devices currently plugged into the managed computer system (see Table 1). More particularly, the first sensor then counts the number of devices that appear in the device history table (Table 2), do not appear in the currently plugged-in devices table (Table 1), have a device name that starts with 'USB', and were removed from the device between the first lookback period (e.g., seven day) ago and a second lookback period ago (e.g., ten minutes). Note than in this embodiment, a USB-device that was removed more than the second lookback period ago may be taken to be equivalent to determining that the USB-device has been unplugged and has remained unplugged more than the predetermined removal-time threshold. For example only, see the example data contained in Table 1 and Table 2 below. In an embodiment, the monitoring and learning module 40 is configured to generate the tables 1 and 2 using original data 38. Table 1 and table 2 are considered part of the historic record 24. The method proceeds to step 104.

In step 104, the first sensor determines whether the number of devices determined in step 102 is greater than zero. This constitutes an additional sensor condition. If the answer is NO, then the method branches back to step 102. However, if the answer is YES (i.e., when this count is greater than zero), then the first sensor is activated, which is shown in step 106. The method thereafter proceeds to step 108.

In step 108, the first sensor via the alert detection system 26 records the first sensor activation in the managed (local) database associated with the subject managed computer system. The method proceeds to step 110.

In step 110, the remediation action module 42 is configured to effect any predetermined remediation action(s) associated with the first sensor, such as any one or more of the actions described in connection with FIG. 8.

The underlying rationale of the first sensor is that a kiosk, informational display, or the like may have such a USB device (e.g., user input keyboard) connected more or less permanently, such that the USB device being disconnected indicates a problem. One example would be where the USB device is the input device. Detecting that the device is disconnected almost certainly means that the USB device will not be working for the user/consumer. A second example may be a printing device—if a boarding pass printing device is disconnected, then a kiosk including the boarding pass printer would not be functional for a user/consumer. A third example may be a kiosk that includes some kind of badge scanner—if the scanning device is disconnected, then the kiosk is not going to be functional for a user/consumer. As noted, usually, the USB devices in these types of applications (e.g., kiosks, informational displays) are permanently connected, which is an interface to the peripherals.

In regard to generating and updating Table 1 and Table 2, Table 1 contains the list of all devices currently present at the managed system; this table is constructed by enumerating peripheral devices through means provided by the operating system and generating rows for a database table that correspond with each such device. In this example, the name of the device, the name of the manufacturer, a status code, the date and time of the last status changed for the device, and the device class are obtained from the operating system and installed in the table. Table 2 contains the list of all devices that have been added or removed from the managed system. Table 2 is constructed by building a list of changes during the construction of Table 1 and recording the time a new device is first detected as the Device Add Date and when a device previously detected is no longer present, recording the time that the loss of the device was detected as the Device Remove Date.

TABLE 1

Sample Device Data (Devices Currently Plugged In)

| Device Name | Manufacturer | Device Status | Date and Time of Last Status Change | Device Class |
|---|---|---|---|---|
| HID Keyboard Device (ID = 1014) | (Standard keyboards) (ID = 2406) | OK (ID = 431) | Aug. 30, 2020 17:25 | Keyboard (ID = 2407) |
| HID-compliant vendor-defined device (ID = 2332) | (Standard system devices) (ID = 2196) | OK (ID = 431) | Aug. 30, 2020 17:25 | HIDClass (ID = 2236) |
| USB Composite Device (ID = 2480) | (Standard USB Host Controller) (ID = 2482) | OK (ID = 431) | Aug. 30, 2020 17:25 | USB (ID = 2226) |
| USB Input Device (ID = 3308) | (Standard system devices) (ID = 2196) | OK (ID = 431) | Aug. 30, 2020 17:25 | HIDClass (ID = 2236) |
| HID-compliant vendor-defined device (ID = 2332) | (Standard system devices) (ID = 2196) | OK (ID = 431) | Aug. 30, 2020 17:25 | HIDClass (ID = 2236) |
| HID-compliant vendor-defined device (ID = 2332) | (Standard system devices) (ID = 2196) | OK (ID = 431) | Aug. 30, 2020 17:25 | HIDClass (ID = 2236) |
| HID-compliant vendor-defined device (ID = 2332) | (Standard system devices) (ID = 2196) | OK (ID = 431) | Aug. 30, 2020 17:25 | HIDClass (ID = 2236) |
| HID-compliant mouse (ID = 1020) | Microsoft (ID = 1010) | OK (ID = 431) | Aug. 30, 2020 17:25 | Mouse (ID = 2282) |
| USB Input Device (ID = 3308) | (Standard system devices) (ID = 2196) | OK (ID = 431) | Aug. 30, 2020 17:25 | HIDClass (ID = 2236) |
| HID-compliant consumer control device (ID = 2447) | Microsoft (ID = 1010) | OK (ID = 431) | Aug. 30, 2020 17:25 | HIDClass (ID = 2236) |
| USB Input Device (ID = 3308) | (Standard system devices) (ID = 2196) | OK (ID = 431) | Aug. 30, 2020 17:25 | HIDClass (ID = 2236) |
| HID-compliant system controller (ID = 2489) | (Standard system devices) (ID = 2196) | OK (ID = 431) | Aug. 30, 2020 17:25 | HIDClass (ID = 2236) |
| Send To OneNote 2016 (ID = 1030) | Microsoft (ID = 1010) | OK (ID = 431) | Aug. 30, 2020 16:16 | PrintQueue (ID = 2188) |
| OneNote for Windows 10 (ID = 6170) | Microsoft (ID = 1010) | OK (ID = 431) | Aug. 30, 2020 16:16 | PrintQueue (ID = 2188) |
| Microsoft Wi-Fi Direct Virtual Adapter #2 (ID = 2295) | Microsoft (ID = 1010) | OK (ID = 431) | Aug. 12, 2020 19:22 | Net (ID = 2217) |
| Intel(R) Display Audio (ID = 1012) | Intel(R) Corporation (ID = 86) | OK (ID = 431) | Jun. 24, 2020 15:01 | MEDIA (ID = 2201) |
| Dell Data Vault Control Device (ID = 2500) | Dell Technologies (ID = 2502) | OK (ID = 431) | Jun. 5, 2020 19:51 | System (ID = 1149) |
| Speakers/Headphones (Realtek(R) Audio) (ID = 2433) | Microsoft (ID = 1010) | OK (ID = 431) | Jun. 5, 2020 19:51 | AudioEndpoint (ID = 2240) |
| Microphone Array (Realtek(R) Audio) (ID = 2237) | Microsoft (ID = 1010) | OK (ID = 431) | Jun. 5, 2020 19:51 | AudioEndpoint (ID = 2240) |
| \\infpbhvfsv1\Lexmark x945e (ID = 2423) | Lexmark (ID = 2425) | OK (ID = 431) | Apr. 4, 2020 0:05 | PrintQueue (ID = 2188) |
| Intel(R) Graphics Command Center (ID = 5139) | Intel Corporation (ID = 51) | OK (ID = 431) | Feb. 20, 2020 15:09 | SoftwareComponent (ID = 2193) |
| ACPI x64-based PC (ID = 2386) | (Standard computers) (ID = 2389) | OK (ID = 431) | Nov. 12, 2019 19:46 | Computer (ID = 2391) |

TABLE 1-continued

Sample Device Data (Devices Currently Plugged In)

| Device Name | Manufacturer | Device Status | Date and Time of Last Status Change | Device Class |
|---|---|---|---|---|
| Intel(R) Active Management Technology - SOL (COM3) (ID = 1053) | Intel (ID = 445) | OK (ID = 431) | Nov. 12, 2019 19:46 | Ports (ID = 2394) |
| WAN Miniport (Network Monitor) (ID = 2395) | Microsoft (ID = 1010) | OK (ID = 431) | Nov. 12, 2019 19:46 | Net (ID = 2217) |
| WAN Miniport (IP) (ID = 2397) | Microsoft (ID = 1010) | OK (ID = 431) | Nov. 12, 2019 19:46 | Net (ID = 2217) |

TABLE 2

Sample Device History Data

| System Name | Device Name | Device Add Date | Device Remove Date |
|---|---|---|---|
| ENGPBHMNSD1.ENGI.LAKE-SIDESOFTWARE.ORG | Microsoft Streaming Service Proxy (ID = 1635) | Aug. 17, 2020 20:18 | Aug. 17, 2020 22:38 |
| ENGPBHMNSD1.ENGI.LAKE-SIDESOFTWARE.ORG | Microsoft Streaming Service Proxy (ID = 1635) | Aug. 16, 2020 18:55 | Aug. 16, 2020 21:10 |
| ENGPBHMNSD1.ENGI.LAKE-SIDESOFTWARE.ORG | Microsoft Streaming Service Proxy (ID = 1635) | Aug. 14, 2020 20:19 | Aug. 14, 2020 23:03 |
| ENGPBHMNSD1.ENGI.LAKE-SIDESOFTWARE.ORG | OneNote for Windows 10 (ID = 6170) | Aug. 12, 2020 19:22 | Aug. 30, 2020 16:16 |
| ENGPBHMNSD1.ENGI.LAKE-SIDESOFTWARE.ORG | Microsoft Streaming Service Proxy (ID = 1635) | Aug. 2, 2020 16:59 | Aug. 2, 2020 17:09 |
| ENGPBHMNSD1.ENGI.LAKE-SIDESOFTWARE.ORG | Microsoft Wi-Fi Direct Virtual Adapter #2 (ID = 2295) | Jul. 29, 2020 19:37 | Aug. 2, 2020 17:09 |
| ENGPBHMNSD1.ENGI.LAKE-SIDESOFTWARE.ORG | Send To OneNote 2016 (ID = 1030) | Jul. 28, 2020 18:15 | Aug. 30, 2020 16:16 |
| ENGPBHMNSD1.ENGI.LAKE-SIDESOFTWARE.ORG | Microsoft Wi-Fi Direct Virtual Adapter #2 (ID = 2295) | Jul. 28, 2020 16:06 | Jul. 29, 2020 18:37 |
| ENGPBHMNSD1.ENGI.LAKE-SIDESOFTWARE.ORG | Microsoft Streaming Service Proxy (ID = 1635) | Jul. 6, 2020 12:45 | Jul. 6, 2020 12:50 |
| ENGPBHMNSD1.ENGI.LAKE-SIDESOFTWARE.ORG | HID Keyboard Device (ID = 1014) | Jul. 4, 2020 23:40 | Jul. 6, 2020 12:45 |
| ENGPBHMNSD1.ENGI.LAKE-SIDESOFTWARE.ORG | HID-compliant vendor-defined device (ID = 2332) | Jul. 4, 2020 23:40 | Jul. 6, 2020 12:45 |
| ENGPBHMNSD1.ENGI.LAKE-SIDESOFTWARE.ORG | USB Input Device (ID = 3308) | Jul. 4, 2020 23:40 | Jul. 6, 2020 12:45 |
| ENGPBHMNSD1.ENGI.LAKE-SIDESOFTWARE.ORG | HID-compliant mouse (ID = 1020) | Jul. 4, 2020 23:40 | Jul. 6, 2020 12:45 |
| ENGPBHMNSD1.ENGI.LAKE-SIDESOFTWARE.ORG | USB Input Device (ID = 3308) | Jul. 4, 2020 23:40 | Jul. 6, 2020 12:45 |
| ENGPBHMNSD1.ENGI.LAKE-SIDESOFTWARE.ORG | HID-compliant consumer control device (ID = 2447) | Jul. 4, 2020 23:40 | Jul. 6, 2020 12:45 |
| ENGPBHMNSD1.ENGI.LAKE-SIDESOFTWARE.ORG | USB Composite Device (ID = 2480) | Jul. 4, 2020 23:40 | Jul. 6, 2020 12:45 |
| ENGPBHMNSD1.ENGI.LAKE-SIDESOFTWARE.ORG | HID-compliant vendor-defined device (ID = 2332) | Jul. 4, 2020 23:10 | Jul. 4, 2020 23:20 |
| ENGPBHMNSD1.ENGI.LAKE-SIDESOFTWARE.ORG | HID-compliant consumer control device (ID = 2447) | Jul. 4, 2020 23:10 | Jul. 4, 2020 23:20 |
| ENGPBHMNSD1.ENGI.LAKE-SIDESOFTWARE.ORG | HID Keyboard Device (ID = 1014) | Jul. 4, 2020 23:10 | Jul. 4, 2020 23:20 |
| ENGPBHMNSD1.ENGI.LAKE-SIDESOFTWARE.ORG | USB Input Device (ID = 3308) | Jul. 4, 2020 23:10 | Jul. 4, 2020 23:20 |

TABLE 2-continued

Sample Device History Data

| System Name | Device Name | Device Add Date | Device Remove Date |
|---|---|---|---|
| ENGPBHMNSD1.ENGI.LAKE-SIDESOFTWARE.ORG | HID-compliant mouse (ID = 1020) | Jul. 4, 2020 23:10 | Jul. 4, 2020 23:20 |
| ENGPBHMNSD1.ENGI.LAKE-SIDESOFTWARE.ORG | USB Input Device (ID = 3308) | Jul. 4, 2020 23:10 | Jul. 4, 2020 23:20 |
| ENGPBHMNSD1.ENGI.LAKE-SIDESOFTWARE.ORG | USB Composite Device (ID = 2480) | Jul. 4, 2020 23:10 | Jul. 4, 2020 23:20 |
| ENGPBHMNSD1.ENGI.LAKE-SIDESOFTWARE.ORG | USB Input Device (ID = 3308) | Jul. 4, 2020 22:36 | Jul. 4, 2020 22:53 |

Figure 12:
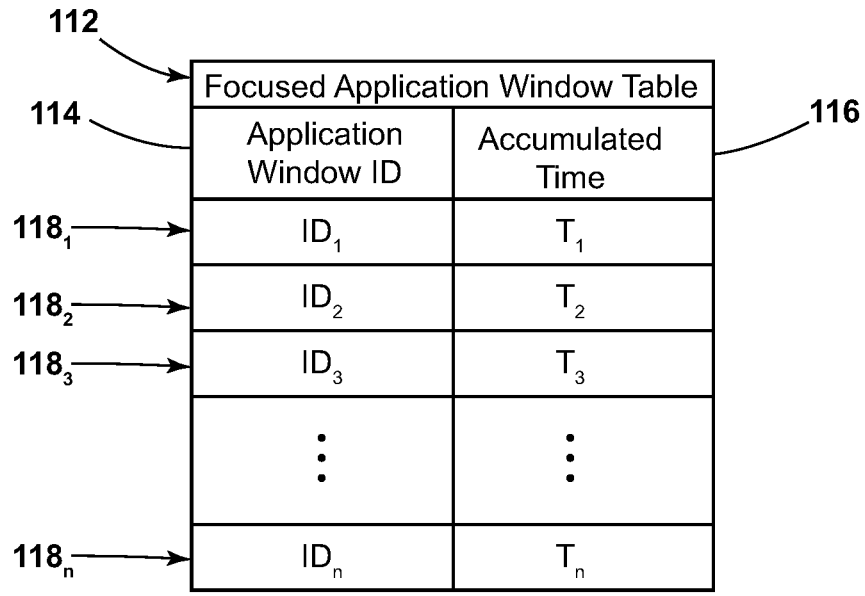
FIG. 12 is a diagrammatic view of a focused window table for supporting the operation of a second sensor (and the fourth sensor in an embodiment).

Focus Changed from the Most Focused. FIG. 12 is a diagrammatic view of a focused window table 112 for use in connection with a second sensor, for determining when focus has changed from the most focused window. In a computer-implemented graphical user interface (GUI), a window of the GUI has focus when it is set to receive user input (e.g., only one window at a time will receive keyboard input and is therefore said to have keyboard focus). The second sensor uses a focused window table 112 that identifies the application/windows that have had focus for the greatest amount of time (accumulated). The table 112 is part of the historic record 24.

In an embodiment, the focused window table 112 includes at least a first column/field 114 corresponding to an application/window ID as shown with values $ID_1$, $ID_2$, $ID_3$, ..., $ID_n$ and a second column/field 116 corresponding to an accumulated time with which the associated window has had focus, as shown with values $T_1$, $T_2$, $T_3$, ..., $T_n$. The table 112 includes one or more rows respectively designated $118_1$, $118_2$, $118_3$, ..., $118_n$ where n is the total number of rows in table 112. Each row $118_1$, $118_2$, $118_3$, ..., $118_n$ therefore has a data pair for example ($ID_1$, $T_1$)—comprising a respective application/window ID and a respective accumulated time. The monitoring and learning module 40 is configured to generate table 112 using information contained in the original data 38, which table 112 constitutes a historic characteristic of the managed computer system 12 since the accumulated amount of time that a particular window has had focus is determined over time. Table 112 is part of historic record 24, and is provided for description purposes only and a particular implementation may take other forms now known or hereafter developed.

In regard to determining the identification of an application owning a window, every window is owned by one application (or the operating system itself) and it is possible to determine the owning application for a window through means provided by the operating system. In an embodiment of the present invention, the window that holds the input focus is determined which in turn allows identification of the owning application. When an application first gains the focus, an embodiment of the invention starts a timer; this timer is stopped when the application relinquishes focus to another application or the operating system or when the system is shutdown. A table is maintained of all applications that hold the focus over time, and the total focus time is accumulated.

Figure 13:
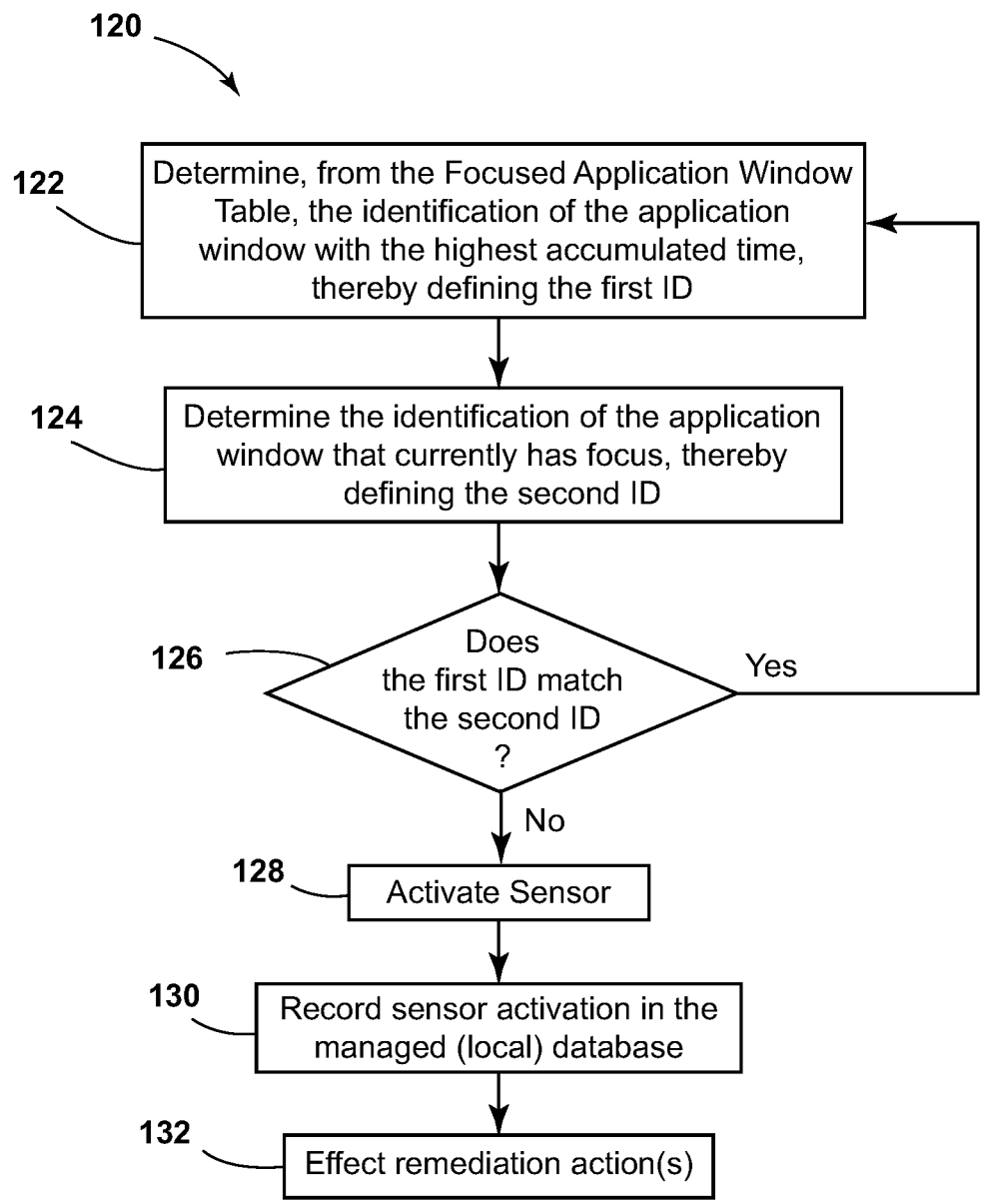
FIG. 13 is a flowchart showing the operation of the second sensor for detecting, using the table of FIG. 12, when the window that currently has focus has changed from the most focused window.

FIG. 13 is a flowchart showing a method 120 of the operation of the second sensor, which uses the focused table 112. This second sensor is configured to trigger (be activated) when the currently focused window is not the application that has the most accumulated time as the focused window. The method begins in step 122.

In step 122, the second sensor via the alert detection system 26, determines the identification of the most focused application, by evaluating a respective total time that each candidate has had as the focused application in the foreground in the local database and then determining which has the highest total time (accumulated). This step may be performed by the second sensor with reference to table 112, specifically, determining the row having associated therewith the greatest accumulated time (i.e., which of $T_1$, $T_2$, $T_3$, ..., $T_n$ is the greatest), which will determine the associated application window ID. This can define a first ID. The method proceeds to step 124.

In step 124, the second sensor determines the identification (ID) of the currently-focused application (window thereof). This can define a second ID. The method proceeds to step 126.

In step 126, the second sensor compares the ID of the currently-focused application (second ID) and checks it against the ID of the most-focused application (first ID). When the first and second ID's match each other, then the second sensor remains inactive (i.e., there is no activation of the second sensor) and the method branches back to step 122. However, when the first and second ID's do not match (i.e., are different), then the method proceeds to step 128, wherein the second sensor is activated. If the most focused application is not the currently-focused application, then there is a good chance that the managed computer system is not running as intended. In an embodiment, a time threshold is involved where the currently focused application has to be the "wrong" application (i.e., whose ID does not match the ID of the application that has the most time as the focused application) for a predetermined period of time before the second sensor's logic activates the sensor. The method proceeds to step 130.

In step 130, the second sensor's activation is recorded in the managed (local) database and the method proceeds to step 132.

In step 132, the remediation action module 42 is configured to effect any predetermined remediation action(s) associated with the second sensor, such as any one or more of the actions described in connection with FIG. 8.

Figure 14:
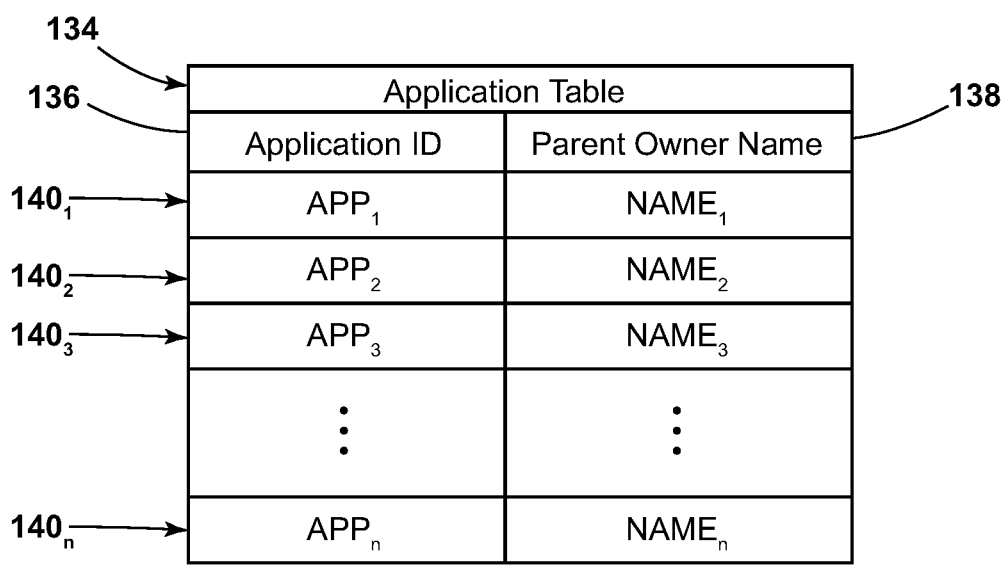
FIG. 14 is a diagrammatic view of a currently running application table for supporting the operation of a third sensor.

Focus Window Owned by the Operating System (e.g., Microsoft for the Windows Operating System). FIG. 14 is a diagrammatic view of an application table 134 for use in connection with a third sensor for determining when the currently focused foreground window is owned by the operating system. The third sensor seeks to detect when an application is running incorrectly or crashes, since in this situation, many times a window associated with an operating system component will pop up notifying the user of the malfunction. In an embodiment, the table 134 includes at least a first column/field 136 corresponding to an application/window ID as shown with values $APP_1$, $APP_2$, $APP_3$, ..., $APP_n$ and a second column/field 138 corresponding to a parent owner name with which the application window identification is associated, as shown with values $NAME_1$, $NAME_2$, $NAME_3$, ..., $NAME_n$.

In regard to determining the owner of an application versus determining the owner of the operating system (or components thereof), the operating system uses various applications as part of its processing which may interact with the user. Such interaction often included user interface windows. The operating system has an authentication context that is different from a logged in user or the credentials used to execute services which may operate much like an application on the system. After an embodiment of the invention determines the owner of the window that has the focus, it uses operating system services to determine the owning application or process, and then determines the credentials under which it is running. If the credentials indicate the application or process is running as part of the operating system, the embodiment of the invention treats the window as owned by such operating system.

The table 134 includes one or more rows respectively designated $140_1, 140_2, 140_3, \ldots, 140_n$ where n is the total number of rows in the table 134. Each row $140_1, 140_2, 140_3, \ldots, 140_n$ therefore has a data pair for example ($APP_1$, $NAME_1$) associated therewith comprising a respective application/window ID and its corresponding parent owner name. The monitoring and learning module 40 is configured to generate table 134 using information contained in the original data 38. In an embodiment, in the managed (local) database, the names of each application being run on the managed computer system are stored along with their corresponding parent owner name (i.e., table 134 in an embodiment). Table 134 is part of the historic record 24 and is provided for description purposes only and any particular implementation may take other forms now known or hereafter developed.

Figure 15:
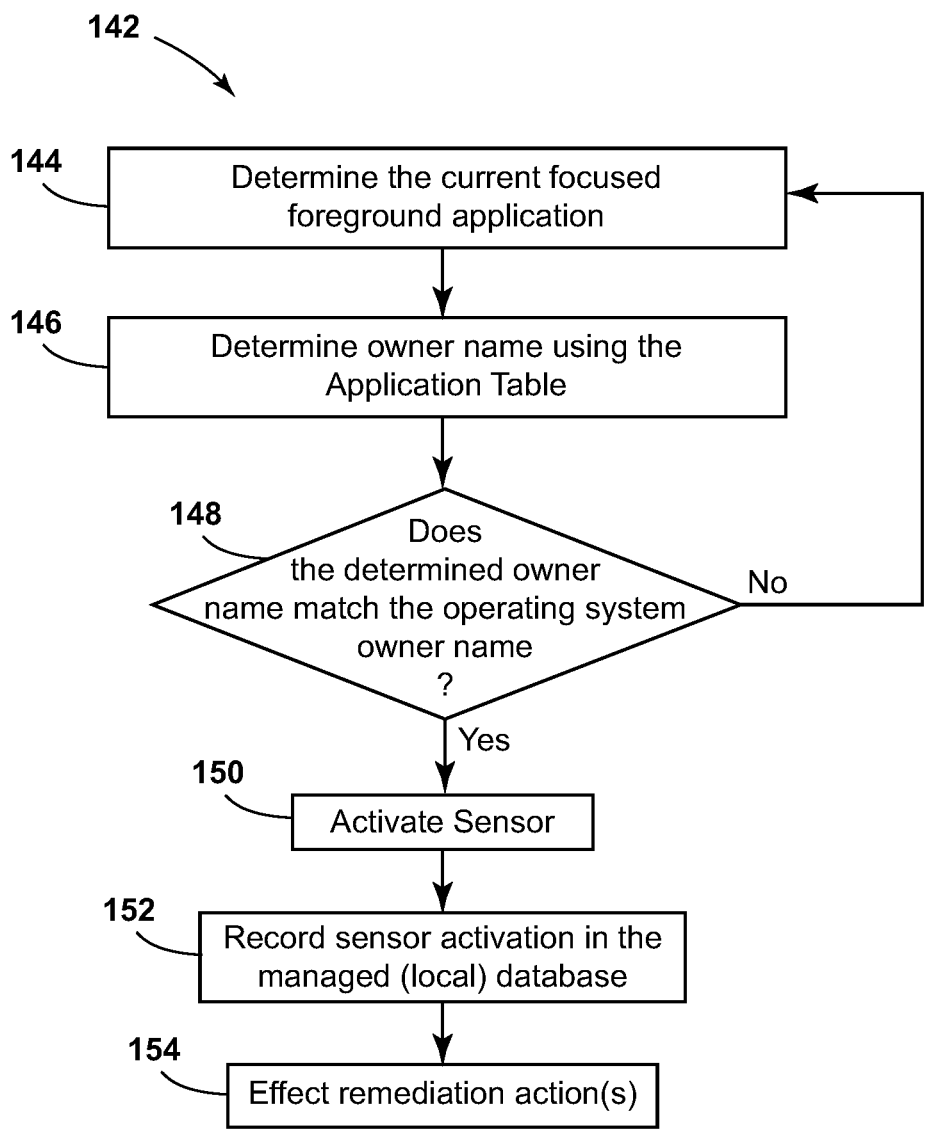
FIG. 15 is a flowchart showing the operation of the third sensor for detecting, using the table of FIG. 14, when the window that currently has focus is associated with an owner of an operating system component.

FIG. 15 is a flowchart showing a method 142 of the operation of the third sensor using the table 134 of FIG. 14. The third sensor is activated when the currently focused foreground window (i.e., the application thereof) is owned by the owner of operating system component(s) on the managed computer system. The method 142 begins in step 144.

In step 144, the third sensor via the alert detection system 26 determines the currently focused foreground application/window thereof. The method proceeds to step 146.

In step 146, now having determined the currently focused foregoing application/window thereof in step 144, the third sensor can determine its owner name using the table 134 stored in the managed (local) database. The method proceeds to step 148.

In step 148, the third sensor determines if the currently focused foreground application is part of the operating system, for example, by comparing the owner name of the currently-running foregoing application/window thereof with the owner of the operating system component(s). In other words, if the determined owner name match the operating system owner name, then the currently focused foreground window is owned by the operating system, and the answer to the inquiry is YES and the method proceeds to step 150 where the sensor is activated. Otherwise, if the determined application owner is anything else, then the answer to the inquiry is NO and the method branches back to step 144—the third sensor is thus not activated but rather remains inactivated. The method proceeds to step 152.

In step 152, the alert detection system 26 records the third sensor's activation in the managed (local) database and the method proceeds to step 154.

In step 154, the remediation action module 42 is configured to effect any predetermined remediation action(s) associated with the third sensor, such as any one or more of the actions described in connection with FIG. 8.

The rationale for the third sensor is as follows: when an application is running incorrectly or crashes, many times an operating system window will pop up notifying the user of the malfunction, which is what this third sensor is looking for (e.g., a notification of an application crash or notification of a system problem). In other words, the third sensor is configured to detect the owning application and whether that application is part of the operating system. On a Windows-based managed computer system, for example, the third sensor is configured to determine if a given application is executing as part of the operating system (the owner name include "Microsoft"). If the third sensor determines that the operating system owns the foreground window, then the intended application is not the one with which the user would be interacting. This third sensor will add extra clarity to whether a kiosk or informational display is in a functional state or not.

Figure 16:
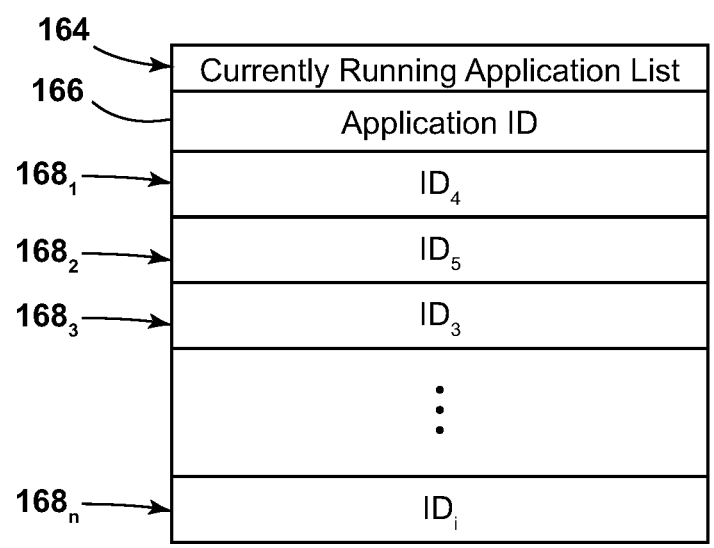
FIG. 16 is a diagrammatic view of a currently running application list for supporting the operation of a fourth sensor.

Most Focused Application is Not Running. FIG. 16 is a diagrammatic view of a currently-running application list 164 for use in connection with a fourth sensor for determining when the most focused application is not running. In an embodiment where the managed computer system comprises a kiosk, for example, the most focused application should almost always be running on the managed computer system (kiosk), which if not true may indicate an error or fail state (since that application typically provides the base functionality of the kiosk). The list 164 includes at least a single column/field 166 corresponding to an application ID, as shown with exemplary values $ID_4, ID_5, ID_3, \ldots, ID_i$ wherein i denotes the number of currently running applications. Note that the series of IDs are not necessarily all the application that have ever run on the managed computer system and are thus shown for illustrative purposes as i=4, 5, 3, ..., i.

In regard to the table containing all the applications currently running on the system, the collection agent part of an embodiment of the invention checks frequently to find all applications running on the system. It periodically gathers information such as performance, connectivity, and resource consumption for such applications. The collection agent maintains a table in the local database the records all such applications including an indication of whether they are still active. In the present embodiment, the collection agent checks for new processes and collects statistics every five seconds or as may be configured. The sensors may access the application table so created as needed to provide their functionality.

Figure 17:
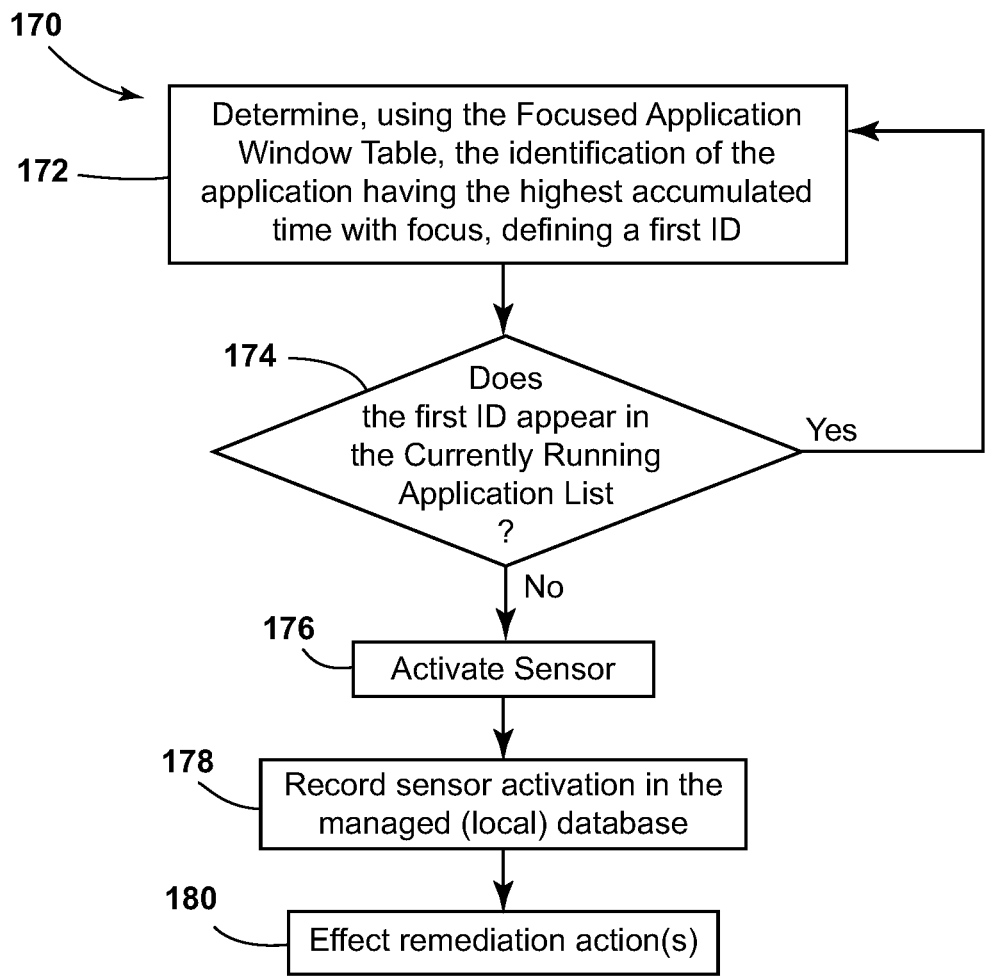
FIG. 17 is a flowchart showing the operation of the fourth sensor for detecting, using the tables in FIG. 12 and FIG. 16, when the most focused application is not currently running.

FIG. 17 is a flowchart showing a method 170 of the operation of the fourth sensor, which in an embodiment is configured to be activated when the application with the greatest amount of focus time is not currently running on the managed computer system. The method begins in step 172.

In step 172, the fourth sensor via the alert detection system 26 determines the identification of the application with the highest accumulated time having focus, which identification defines a first ID. In an embodiment, the method 170 may use the focused application table 112 as in FIG. 12. Thus, it should be appreciated that for the fourth sensor, the most focused application may be determined using the same approach/method and data table 112 as was described above for the second sensor described above (i.e., for the second sensor: "Focus Changed from Most Focused"). The method proceeds to step 174.

In step 174, the fourth sensor via the alert detection system 26 determines whether the identification of the application determined in step 172 (i.e., the first ID) appears in the currently running applications list 164. In an embodiment, the identification itself may take the form of a name wherein step 174 involves cross-referencing the name of the most focused application from step 172 with the contents of table 164 containing all the applications currently running on the managed computer system. If the answer in step 174 is YES, then the method branches back to step 172. However, if the answer in step 174 is NO (i.e., the name of the most focused application—first ID—is not present in table 164), then the method proceeds to step 176, wherein the fourth sensor is activated. In kiosk embodiment (mode), the most focused application should almost always be running on the managed computer system. If it is not running, then there is a good chance that the managed computer system is in some kind of error or fail state. The method proceeds to step 178.

In step 178, the alert detection system 26 records the fourth sensor's activation in the managed (local) database and the method proceeds to step 180.

In step 180, the remediation action module 42 is configured to effect any predetermined remediation action(s) associated with the fourth sensor, such as any one or more of the actions described in connection with FIG. 8.

Figure 18:
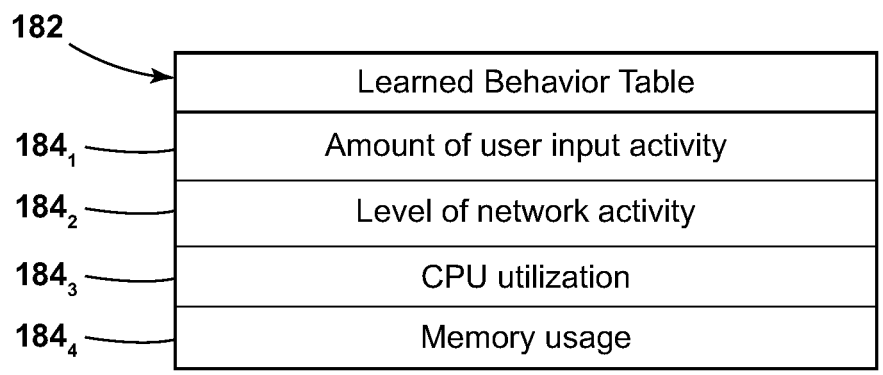
FIG. 18 is a diagrammatic view of a learned behavior table.

Learned Behavior. FIG. 18 is a diagrammatic view of a learned behavior table 182, which includes a number of rows containing parameters with values varying over time. Parameter $184_1$ relates to an amount of user input activity, whose value may vary over time. In an embodiment where the managed computer system comprises a kiosk designed for user/customer interaction, for example only, the amount or value of such user input activity may not only vary over time, but may exhibit discernible time-related patterns depending on the day of the week (D.O.W.) and the time of day (T.O.D).

Parameter $184_2$ relates to an amount of network activity (traffic), whose value may vary over time. In an embodiment, the amount or value of such network activity may not only vary over time, but may also exhibit discernible time-related patterns depending on the day of the week (D.O.W.) and the time of day (T.O.D). For example, when a detected amount/level of network activity is significantly lower the observed/historic levels for the same D.O.W. and T.O.D., then there may be a problem with an application or with the connectivity of the managed computer system to the network.

Parameters $184_3$ and $184_4$ relates to a CPU utilization level (e.g., percent) and a memory usage level (e.g., percentage of total or absolute amount) relating to the managed computer system, which amounts/levels may vary over time. Significant variance from historic (learned) patterns may be signal that there is a problem with some aspect of the managed computer system. Similar observations may be made in relation to other operational/performance metrics, such as I/O activity (i.e., with respect to storage such as disk storage) generally as well as other resource-based metrics. A detailed description of the fifth and sixth sensors, which relate to the above-mentioned parameters $184_1$ and $184_2$ will now be set forth.

User Input Does Not Match Learned Behavior. FIG. 19 is a diagrammatic view of a user input activity table 186 for use in connection with a fifth sensor for determining when current user input activity does not match the historic (learned) user input behavior/patterns. The table 186 may include at least three columns/fields, including a day of the week (D.O.W.) field 188, a time of day (T.O.D.) field 190, and a user input activity field 192. The table 186 is included in the historic record 24 and the monitoring and learning module 40 is configured to create the table 186 using the original data 38 from the managed (local) database.

In regard to determining historic value(s) for user input activity, the collection agent monitors user input activity over time and records it in the collection database tables on both the system level and for the specific applications that had the input focus when such input activity occurred. The total amount of such activity is recorded in discrete intervals that may be predefined or configured, such as one hour. This recording results in development of a historical record of total input activity in each discrete interval by application, where the date and time of the start of the period, the total input activity count, and the associated application are recorded. This historical record in an embodiment of the invention is available for use by sensors. Such sensors may use a configurable lookback period (for example, the previous three weeks) by querying the historical record for the selected period and computing statistics such as the mathematical average.

In the exemplary table 186, there may be one or more rows $194_1$, $194_2$, $194_3$, ..., $194_7$—for example one row for each day of the week (D.O.W.) covered by the table 186. For each row $194_1$, $194_2$, $194_3$, ..., $194_7$ there may be a respective one or more time of day (T.O.D.) entries defined in a meaningful manner dependent on the particular use of the managed computer system. For example, as shown in the figure, the T.O.D. may be a general "breakfast", "lunch" and "dinner" for a kiosk deployed in an order entry capacity at a food service, or alternatively may be defined more explicitly, for example only, a time period such as 7 AM—11 AM, 11 AM-1 PM, and 5 PM-7 PM. A still further alternative may include hourly intervals for all hours of operation, which will result in more T.O.D. entries in the table 186. It should be understood that each D.O.W. in the table may have either the same T.O.D. intervals or alternatively may have a different number of T.O.D. intervals from other D.O.W, or still further alternatively may have no T.O.D. intervals at all (e.g., closed on Monday). For example, table 186 shows that Sunday has three T.O.D/User Input Activity data pairs designated $196_1$, $196_2$, and $196_3$, while Monday only has two data pairs, designated $196_4$ and $196_5$. Also, the T.O.D. time intervals within a single D.O.W. may be differ in duration.

Additionally, for each T.O.D. entry, there will be an associated user input activity amount/level, which is shown in the table 186 in narrative fashion as "light", "medium", and "heavy" although it should be understood that this is for description purposes only and in an embodiment may comprise a specific numeric value or range of values. For example, the amount of user input activity may comprise a number of mouse clicks and/or a number of keystrokes in a given sample period, and thus the monitoring and learning module 40 may be so configured to count such number of mouse clicks and/or keystrokes in such given sample period.

In a kiosk embodiment, as an example only, the mechanism to monitor may be configured to record such mouse clicks/keystroke activity between 9:00 and 9:10, wherein five click events occurred and were detected/recorded. For example, each of those input events might correspond with a customer using the kiosk and making a user input. The type of input event might depend on the kind of kiosk hardware and on the nature of the user interaction; there could be a full keyboard in some embodiments.

The monitored/recorded user input activity amount in table 186 may be later used by the fifth sensor, which learns the expected amount of user input according to the D.O.W. and the T.O.D. from observation of data collected in the past. As will be described in connection with FIG. 20, this historic (learned) data is then compared with current user input activity to determine whether the managed computer system (monitored device) is performing as intended.

Figure 20:
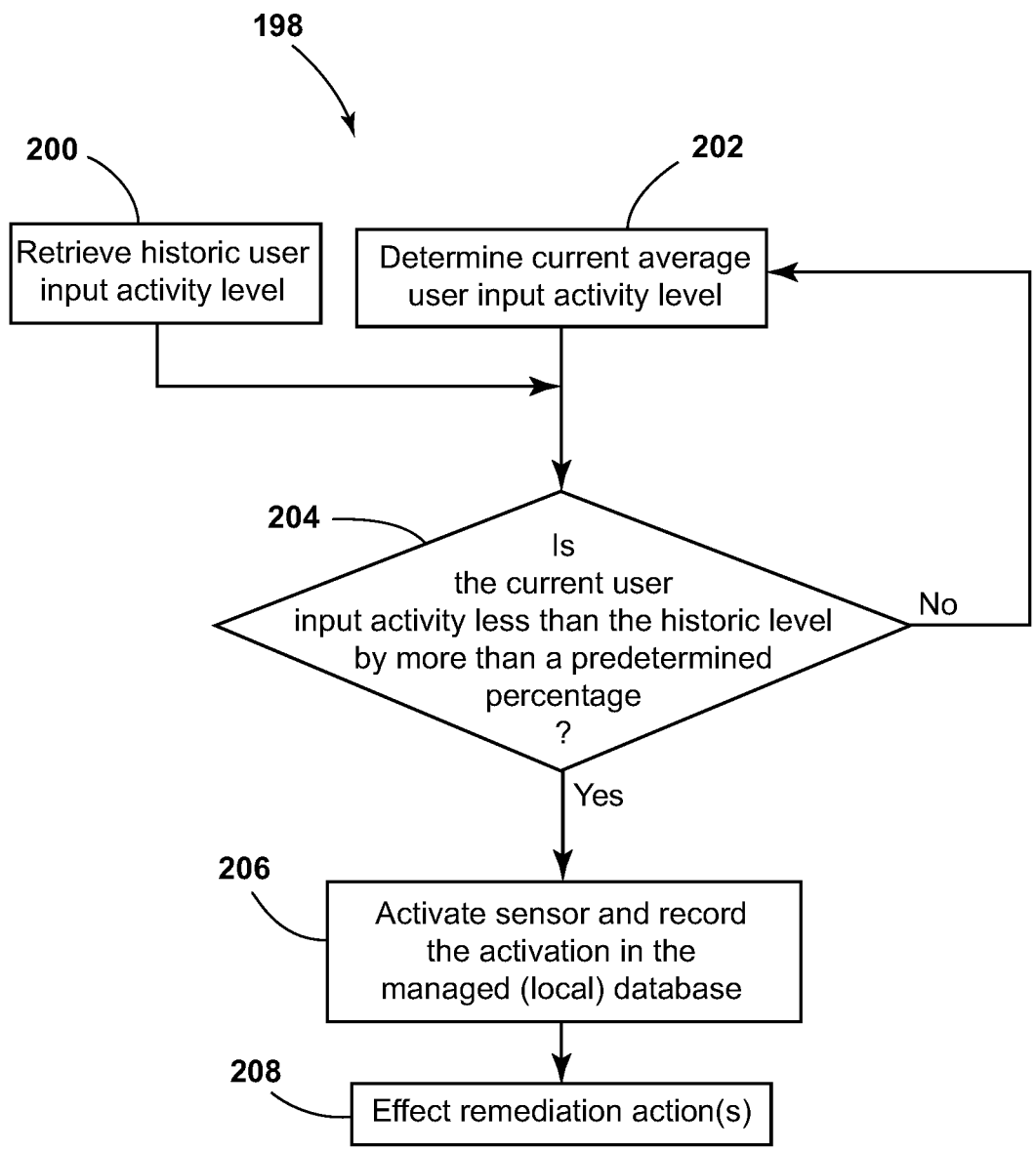
FIG. 20 is a flowchart showing the operation of the fifth sensor for detecting, using the table of FIG. 19, when the current user input activity varies from the historic user input activity by more than a predetermined amount.

FIG. 20 is a flowchart showing a method 198 of the operation of the fifth sensor using table 186. The fifth sensor will be activated when the current user input activity level varies from (e.g., is significantly lower than) the historic (learned) user input activity level by more than a predetermined amount, for the same D.O.W. and T.O.D. If so, then it is likely that a problem exists that will require remediation, through the use of the remediation action module 42. The analysis of the current user input activity level along with the historic behavior learned over a given period of time can help determine if the managed computer system, such as a kiosk, is functioning properly. The method begins in step 200.

In step 200, the fifth sensor via the alert detection system 26 determines the current D.O.W. and T.O.D. and using this information, retrieves the historic (learned) user input activity level from the table 186. The method proceeds to step 202.

In step 202, the fifth sensor is further configured to determine the current user input activity level for the same D.O.W. and T.O.D as was used in step 200. The method proceeds to step 204.

In step 204, the fifth sensor is configured to determine whether the current user input activity level varies from (e.g., is less than) the historic (learned) activity level by more than a predetermined amount. If the answer in step 204 is NO, then the method branches back to step 202. If the answer in step 204 is YES, then the method proceeds to step 206. As an example, if the D.O.W and the T.O.D. is Wednesday at noon, the fifth sensor would be configured to expect, from observing the past weeks' activity (e.g., in table 186), that the managed computer system (e.g., kiosk) should be busy processing orders and thus exhibiting a relatively high user input activity level. If the fifth sensor determines, however, that nobody is pressing any buttons on the kiosk, compared to previous time periods where the kiosk was very busy, then this variance in the current measured activity—compared to the historic (learned) activity—is indicative of a potential problem.

In step 206, the fifth sensor is activated and such activation is recorded in the managed (local) database. In an embodiment, the fifth sensor is configured to make the record in the managed (local) database of the date and time, the amount of the user input activity (but not a recording of the actual content, although this is possible in an alternate embodiment), and the identification of the managed computer system (device) so used. The method proceeds to step 208.

In step 208, the remediation action module 42 is configured to effect any predetermined remediation action(s) associated with the fifth sensor, such as any one or more of the actions described in connection with FIG. 8.

Network Traffic Does Not Match Learned Behavior. FIG. 21 is a diagrammatic view of a network activity table 210 for use in connection with a sixth sensor for determining when a network activity level (traffic) does not match the network activity level's historic (learned) behavior/patterns. The table 210 may include at least three columns/fields, including a day of the week (D.O.W.) field 212, a time of day (T.O.D.) field 214, and a network activity level field 216. The table 210 is included in the historic (learned) record 24 and the monitoring and learning module 40 is configured to create the table 210 using the original data 38 from the managed (local) database.

In regard to determining the historic level (network activity), the collection agent monitors network activity over time and records it in the collection database tables. The total amount of such activity is recorded in discrete intervals that may be predefined or configured, such as one hour. This recording results in development of a historical record of total network activity in each discrete interval, where the date and time of the start of the period, and the total network activity. This historical record in an embodiment of the invention is available for use by sensors. Such sensors may use a configurable lookback period (for example, the previous three weeks) by querying the historical record for the selected period and computing statistics such as the mathematical average.

In the exemplary table 210, there may be one or more rows $218_1, 218_2, 218_3, \ldots, 218_7$—one row for each D.O.W. covered by the table 210. For each row $218_1, 218_2, 218_3, \ldots, 218_7$ there may be one or more T.O.D. entries defined in a meaningful manner dependent on the particular use of the managed computer system. For example, as shown, the T.O.D. column for Sunday (row 218i) may include three particular time intervals that are designated $TOD_1$, $TOD_2$, and $TOD_3$, although it should be understood that each of these time intervals corresponds to an actual time interval (e.g., 7 AM-11 AM). In a kiosk embodiment adapted for food order entry, these time intervals may be correlated to the observed ordering surges similar to the example above used in connection with the fifth sensor. Additionally, a further alternative for the TOD entries may include hourly intervals for all hours of operation, which may result in more T.O.D. entries in the table 210 than shown. It should be understood that each D.O.W. may either have the same T.O.D. intervals or alternatively may have a different number of T.O.D. intervals from other D.O.W, or still further may have no T.O.D. intervals at all (e.g., closed on Monday). As shown in the table 210, Sunday has three T.O.D/User Input Activity data pairs that are designated $220_1$, $220_2$, and $220_3$ while Monday has two such data pairs designated $220_4$ and $220_5$. Also, the T.O.D. time intervals within a single D.O.W. may differ in duration.

Additionally, for each T.O.D. entry, there will be an associated user input activity entry, which is shown in the table 210 as a Network Activity (NA) value—designated in exemplary fashion as $NA_1$, $NA_2$, $NA_3$, $NA_4$, $NA_5$, $NA_6$, $NA_7$, $NA_8$, $NA_9$, $NA_{10}$. It should be understood that this is for description purposes only and in an embodiment the network activity value may comprise a specific numeric value or range of values. The level of network activity may also depend on the kind of kiosk hardware and its intended purpose.

Figure 22:
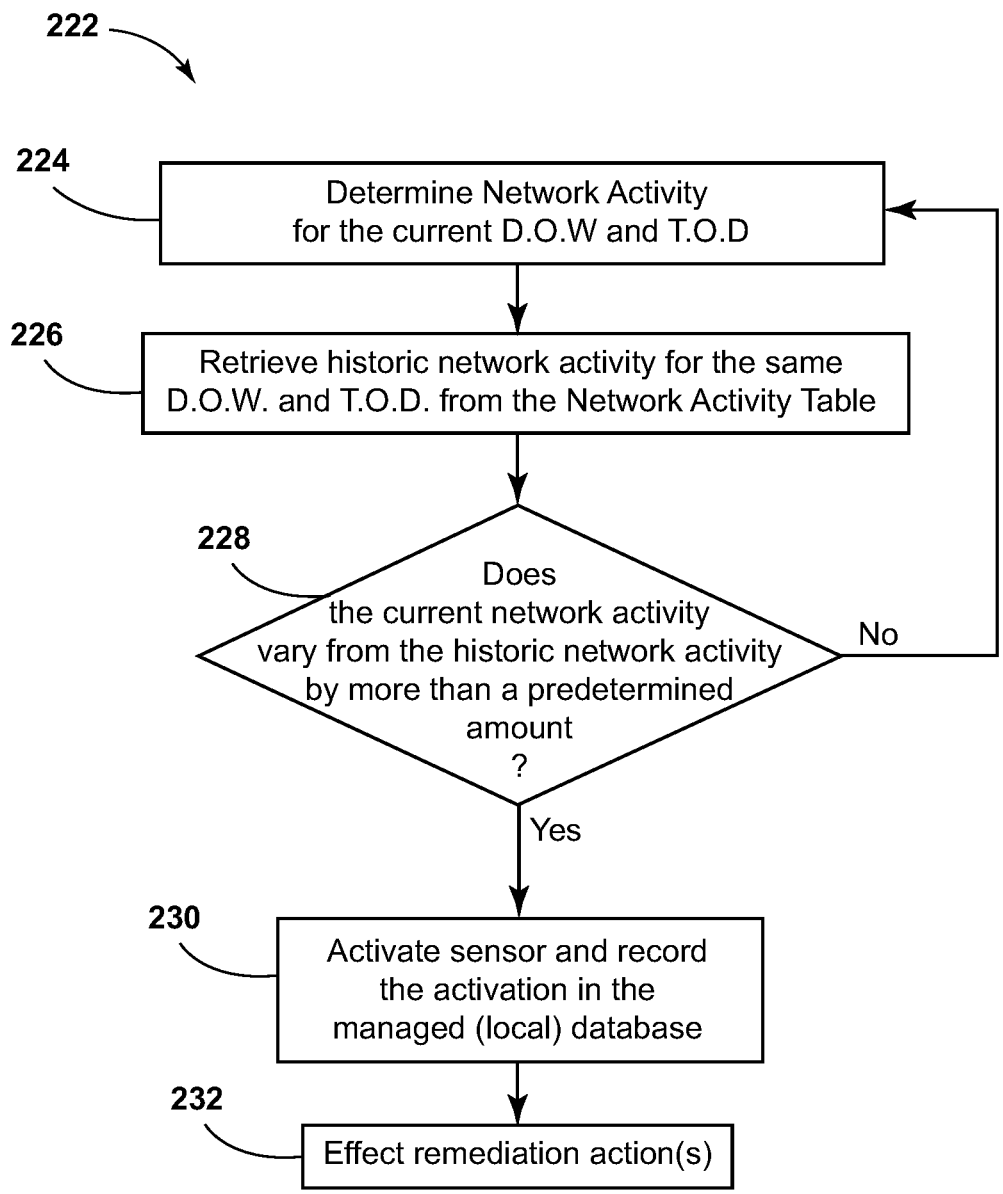
FIG. 22 is a flowchart showing the operation of the sixth sensor for detecting, using the table of FIG. 21, when the current network activity varies from the historic network activity by more than a predetermined amount.

FIG. 22 is a flowchart showing a method 222 of the operation of the sixth sensor using table 210. The sixth sensor will be activated when the current network activity varies by more than a predetermined amount from, for example is significantly lower than or zero, the historic (learned) network activity for the same D.O.W. and T.O.D. The method begins in step 224.

In step 224, the sixth sensor via the alert detection system 26 is configured to determine the network activity level for the current D.O.W. and T.O.D. This determined level may be a total amount of network traffic, or may be some other meaningful, calculated value, depending on the particular usage. The method proceeds to step 226.

In step 226, the sixth sensor retrieves from the network activity table 210 one of the network activity amounts, such as $NA_1$ or $NA_2$ for example, for the same D.O.W. and T.O.D. as used in step 224. The method proceeds to step 228.

In step 228, the sixth sensor operates to compare the current network activity level from step 224 with the historic (learned) network activity level from step 226. In some cases, a significantly lower network activity level or no activity at all may be used to infer either that an application is having a problem and/or that the managed computer system is having a network connectivity problem. In other cases, a significantly higher network activity level may also indicate a problem, inasmuch as improper operation of some component of the managed computer system may also be implied by this determination. If the answer in step 228 is NO, then the method branches back to step 224. However, if the answer in step 228 is YES, then the method proceeds to step 230.

In step 230, the sixth sensor is activated and the sixth sensor's activation is recorded in the managed (local) database. The method proceeds to step 232.

In step 232, the remediation action module 42 is configured to effect any predetermined remediation action(s) associated with the sixth sensor, such as any one or more of the actions described in connection with FIG. 8.

It should be appreciated that further sensors similar to the fifth and sixth sensors may be constructed for CPU utilization, memory usage, I/O activity, and other resource-based metrics.

Also, the notion of developing a historical record and learning what is typical or normal behavior provides a number of advantages over known approaches. Such known approaches are noted for a lack of adequate recording of the history upon which to base detection, their inability to store and process large volumes of such information, requirements for extensive human configuration and setup for each application, and an unavailability of suitable detection algorithms, all being factors that have thus far precluded success in this area.

Generally, a unique attribute of the described sensor system, in an embodiment, is that it is edge-based; that is, the execution of the sensors occurs on the endpoint/kiosk itself. Key benefits from this approach include but are not limited to scalability, cloud friendliness, and the ability to operate when the network is entirely disconnected. A further key attribute, in an embodiment, is that the sensor system is not application specific; that is, it is not necessarily supplied with the application itself by the owner of the application. Thus, by virtue of this, an apparatus including the sensor system (i.e., the alert detection system comprising at least one sensor) may be, in an embodiment, configured independently of an application program executing on the managed computer system that was provided by the provider of such other application program (i.e., and whose original data of which is being collected by the data collection agent and processed by the monitoring and learning module).

In an embodiment, the managed computer may comprise one of (i) an informational display having a display output but having no user input functionality and (ii) a kiosk having an interface that allows the user to interact with the kiosk but which has functionality that precludes the user from changing the purpose of the kiosk. In other words, informational displays may be characterized by their lack of an input device and kiosks may be generally specialized hardware/software combinations intended to fulfill a single purpose and often have a limited input device capability. In an embodiment, both informational displays and kiosks are intended to support many users; that is, they do not have a consistent human user present. Also, both informational displays and kiosks perform a limited set of repetitive tasks whose scope is limited to the single purpose of the device. It is this nature that lends informational displays and kiosks to the learning capabilities of embodiments consistent with the invention.

It should be understood that the managed computer systems and master computer system, particularly the electronic processors included therein, as described in this document, may include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Such electronic processors may further be of the type having both ROM, RAM, a combination of non-volatile and volatile (modifiable) memory so that any software may be stored and yet allow storage and processing of dynamically produced data and/or signals.

It should be further understood that an article of manufacture in accordance with this disclosure includes a computer-readable storage medium having a computer program encoded thereon for implementing the logic of detecting and correcting failures in kiosks, informational displays, and the like, and other functionality described herein. The computer program includes code to perform one or more of the methods and steps thereof disclosed herein. Such embodiments may be configured to execute on one or more processors, multiple processors that are integrated into a single system or are distributed over and connected together through a communications network, and where the network may be wired or wireless.

Although only certain embodiments have been described above with a certain degree of particularity, those skilled in the art could make numerous alterations to the disclosed embodiments without departing from the scope of this disclosure. Additionally, the terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials do not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present disclosure.

What is claimed is:

1. An apparatus for detecting and remediating an anomaly in a managed computing system comprising one of (i) an informational display having a display output but having no user input functionality and (ii) a kiosk having an interface that allows the user to interact with the kiosk but which has functionality that precludes the user from changing a purpose of the kiosk, comprising:

a data collection agent configured to execute on the managed computing system and to collect original data over time associated with components, operation, and configuration of the managed computer system;

a monitoring and learning module configured to execute on the managed computing system and to process said original data and generate a historic record that includes time-based data comprising at least one time-based list in respect of said components, operation, and configuration of the managed computer system;

an alert detection system configured to execute on the managed computer system and comprising at least one sensor having associated therewith one of said at least one time-based list, said at least one sensor being configured to be set to an activated state when sensor conditions associated with said sensor are met to thereby detect said anomaly, said at least one sensor being configured to determine when at least one of said sensor conditions is met by evaluating said at least one time-based list and a current-time value of the components, operation, and configuration of the managed computer system; and a remediation action module configured to execute on the managed computer system and to effect at least one of a plurality of predetermined actions when said at least one sensor is activated.

2. The apparatus of claim 1 wherein said data collection agent is further configured to process said original data according to a first-level analytics strategy to output modified data, wherein said at least one time-based list includes said modified data.

3. The apparatus of claim 2 wherein said at least one time-based list comprises one of a user input activity level as a function of time, a network activity level as a function of time, a central processing unit (CPU) utilization as a function of time, a memory usage as a function of time, and an input/output (I/O) activity as a function of time.

4. The apparatus of claim 3 wherein said monitoring and learning module is configured to determine and record user input activity levels as a function of (i) a day-of-the-week and (ii) a respective time-of-day for each day-of-the-week, and wherein one or more sensor conditions comprise determining when a current user input activity level that is associated with (i) a current day-of-the-week and (ii) a current time-of-day varies by at least a predetermined amount from the determined and recorded historic user input activity level for a corresponding prior day-of-the-week and time-of-day.

5. The apparatus of claim 4 wherein said monitoring and learning module is configured to determine said user input activity level with respect to a plurality of day-of-the-week and time-of-day intervals that are prior in time with respect to said current day-of-the-week and time-of-day.

6. The apparatus of claim 3 wherein said monitoring and learning module is configured to determine and record network traffic levels as a function of (i) a day-of-the-week and (ii) a respective time-of-day for each day-of-the-week, and wherein one or more sensor conditions associated with said at least one sensor comprises determining when a current network activity level that is associated with (i) a current day-of-the-week and (ii) a current time-of-day varies by at least a predetermined amount from the determined and recorded historic network traffic level for a corresponding prior day-of-the-week and time-of-day.

7. The apparatus of claim 2 further comprising a condenser module associated with said managed computer system that is configured to transmit at least a portion of said original data, said modified data, and an activated sensor event to a condensed data store associated with a master computer system, wherein said original data, said modified data, and said activated sensor event define condensed data contained in said condensed data store.

8. The apparatus of claim 7 wherein said managed computer system is a first managed computer system and said data collection agent, said condenser module, said monitoring and learning module, said alert detection system, and said remediation action module respectively comprise a first data collection agent, a first condenser module, a first monitoring and learning module, a first alert detection system, and a first remediation module, said apparatus further comprising a second data collection agent, a second condenser module, a second monitoring and learning module, a second alert detection system, and a second remediation action module all associated with a second managed computer system, said second condenser module being configured to transfer original data, modified data, and an activated sensor event associated with said second managed computer system to said condensed data store, said apparatus further comprising:

an analysis module in said master computer system configured to process condensed data originating with said first and second managed computer systems.

9. The apparatus of claim 8 wherein said analysis module is configured to produce a multi-device output representative of at least one activated sensor event associated with said first and second managed computer systems.

10. The apparatus of claim 1 wherein said at least one time-based list comprises first and second time-based tables, and wherein said monitoring and learning module is configured to determine and record said first time-based table so as to include all devices currently plugged into the managed computer system and to determine and record said second time-based table so as to include all devices that have been removed from the managed computer system, said first time-based table including for said devices included therein a respective currently-plugged in status time-stamp indicating a date and a time that the status of the devices last changed, said second time-based table including for said devices included therein a respective removed time-stamp indicating a date and a time that such devices were removed from the managed computer system.

11. The apparatus of claim 10 wherein said at least one sensor is configured to compare said second time-based table against said first time-based table, and wherein said at least one sensor condition includes determining a number of devices (i) that appear in the second time-based table comprising device history but that do not appear in the first time-based table comprising devices currently plugged-in, (ii) that are universal serial bus (USB) devices, and (iii) that have been removed from the managed computer system between a first predetermined lookback time and a second predetermined lookback time, and wherein said at least one sensor is configured to be activated when said number is greater than zero.

12. The apparatus of claim 11 wherein said first predetermined lookback time is seven days and said second predetermined lookback time is ten minutes.

13. The apparatus of claim 1 wherein said at least one time-based list comprises a focused application window table, and wherein said monitoring and learning module is configured to determine entries in said focused application window table such that each entry includes a respective application window identification and a related accumulated amount of time that an application window has had focus.

14. The apparatus of claim 13 wherein said at least one sensor is configured to compare (i) a first identification corresponding to the identification of the application window from the focused window table that has a highest accumulated time with focus, and (ii) a second identification corresponding to the identification of a current application window of the managed computer system that has focus, a sensor condition being whether said first identification and said second identification do not match, and wherein said at least one sensor is configured to be activated when said sensor condition is satisfied.

15. The apparatus of claim 1 wherein said at least one time-based list comprises a focused application window table and a currently running application table, and wherein said monitoring and learning module is configured to determine entries in said focused application window table such that each entry includes a respective application window identification and a related accumulated amount of time that said application window has had focus, said monitoring and learning module being further configured to determine entries in said currently running application table such that each entry identifies a respective application that is running on the managed computer system.

16. The apparatus of claim 15 wherein said at least one sensor is configured to determine, from the focused application window table, a first identification which identifies the application windows having a highest accumulated amount of time as a first identified application, a sensor condition being whether said first identified application appears in said currently running application table, and wherein said at least one sensor is configured to be activated when said sensor condition is not satisfied.

17. The apparatus of claim 1 wherein said at least one of said predetermined actions comprises (1) a restart of an application; (2) a reboot of an operating system; (3) a restart of the managed computer system; (4) a reset of a network adapter; (5) a reset of a device attached to said managed computer system; (6) a restart of a software service on said managed computer system; and (7) a notification being sent to a predetermined destination.

18. The apparatus of claim 17 wherein said remediation action module comprises at least one of a script and a program configured to perform said at least one of said predetermined actions.

19. The apparatus of claim 1 wherein said monitoring and learning module is configured to determine entries in a currently running application table wherein each entry includes a respective identification of an application and a related application owner name.

20. The apparatus of claim 19 wherein said at least one sensor is configured to determine a current focused foreground application and to further determine, using said currently running application table, the application owner name thereof, a sensor condition being whether said determined application owner name matches an operating system owner name, and wherein said sensor is activated when said sensor condition is satisfied.

21. The apparatus of claim 1 wherein said alert detection system comprising at least one sensor is configured independently of an application program executing on the managed computer system whose original data of which is being collected by said data collection agent and processed by said monitoring and learning module.

* * * * *